US012200461B2

(12) United States Patent
Zeng et al.

(10) Patent No.: US 12,200,461 B2
(45) Date of Patent: Jan. 14, 2025

(54) DOUBLE-SIDED SPEAKER

(71) Applicant: ShenZhen Luxshare Acoustics Technology Ltd., Shenzhen (CN)

(72) Inventors: ZhiHe Zeng, Shenzhen (CN); ZhiHua Tong, Shenzhen (CN)

(73) Assignee: ShenZhen Luxshare Acoustics Technology Ltd., Shenzhen (CN)

( * ) Notice: Subject to any disclaimer, the term of this patent is extended or adjusted under 35 U.S.C. 154(b) by 140 days.

(21) Appl. No.: 17/988,858

(22) Filed: Nov. 17, 2022

(65) Prior Publication Data

US 2023/0224640 A1 Jul. 13, 2023

(30) Foreign Application Priority Data

Jan. 7, 2022 (CN) ......................... 202210015616.0
Sep. 23, 2022 (CN) ......................... 202222555266.5

(51) Int. Cl.

*H04R 9/02* (2006.01)
*H04R 9/04* (2006.01)
*H04R 9/06* (2006.01)

(52) U.S. Cl.

CPC ............... *H04R 9/025* (2013.01); *H04R 9/04* (2013.01); *H04R 9/06* (2013.01); *H04R 2209/041* (2013.01)

(58) Field of Classification Search

CPC . H04R 9/025; H04R 9/04; H04R 9/06; H04R 9/063; H04R 9/045; H04R 9/046; H04R 7/04; H04R 1/2811; H04R 2209/041; H04R 2209/022; H04R 2209/024; H04R 5/02

See application file for complete search history.

(56) References Cited

U.S. PATENT DOCUMENTS

| | | | | |
|---|---|---|---|---|
| 9,736,591 | B2 * | 8/2017 | van Halteren ........... | H04R 7/02 |
| 2020/0275213 | A1 * | 8/2020 | Cho ......................... | H04R 9/04 |

FOREIGN PATENT DOCUMENTS

| | | | |
|---|---|---|---|
| CN | 109788406 | B | 9/2020 |
| CN | 111698618 | A | 9/2020 |
| CN | 112514417 | A | 3/2021 |
| CN | 216531781 | U | 5/2022 |
| TW | 201016039 | A1 | 4/2010 |
| TW | M615881 | U | 8/2021 |
| TW | I741928 | B | 10/2021 |
| TW | M628818 | U | 6/2022 |
| TW | M628819 | U | 6/2022 |

* cited by examiner

*Primary Examiner* — Tuan D Nguyen

(74) *Attorney, Agent, or Firm* — Birch, Stewart, Kolasch & Birch, LLP

(57) ABSTRACT

The present disclosure provides a double-sided speaker, comprising a combination of a magnetic conductive carrying board and a side magnetic conductive member (or magnetic conductive carrying board component), a first magnetic circuit module, a second magnetic circuit module, a first voice coil, a second voice coil, a first vibrating component, and a second vibrating component. The magnetic conductive carrying board comprises two sidewalls and a bottom plate. The two sidewalls are disposed at two sides of one side surface of the bottom plate. The side magnetic conductive member is disposed at two sides of the other side surface of the bottom plate. The first magnetic circuit module is disposed at one side of the magnetic conductive carrying board. The second magnetic circuit module is disposed at the other side of the magnetic conductive carrying board.

46 Claims, 16 Drawing Sheets

1

DOUBLE-SIDED SPEAKER

CROSS-REFERENCE TO RELATED APPLICATION

This application claims the priority benefit of Chinese Patent Application Serial Number CN202210015616.0, filed on Jan. 7, 2022 and Chinese Patent Application Serial Number CN202222555266.5, filed on Sep. 23, 2022, the full disclosure of which is incorporated herein by reference.

BACKGROUND

Technical Field

The present disclosure relates to the technical field of speaker devices, particularly to double-sided speaker.

Related Art

In the prior art, a double-sided speaker is usually formed by two voice coils with a common magnetic circuit module. The interior of the double-sided speaker is divided into two resonance spaces by the magnetic circuit module. The two voice coils are respectively in the two resonance spaces which are not interconnected, so the sound quality of the double-sided speaker tends to be poor. Improving the sound quality of the double-sided speaker by increasing the resonance space would have the size of the double-sided speaker to be increased, which is not suitable for thin electronic devices.

SUMMARY

The embodiments of the present disclosure provide a double-sided speaker tended to solve the problem of poor sound quality.

The present disclosure in a first aspect provides a double-sided speaker, comprising a magnetic conductive carrying board, a side magnetic conductive member, a first magnetic circuit module, a second magnetic circuit module, a first voice coil, a second voice coil, a first vibrating component, and a second vibrating component. The magnetic conductive carrying board comprises two sidewalls and a bottom plate. The two sidewalls are disposed at two sides of one side surface of the bottom plate. The side magnetic conductive member is disposed at two sides of the other side surface of the bottom plate. The first magnetic circuit module is disposed at one side of the magnetic conductive carrying board. The second magnetic circuit module is disposed at the other side of the magnetic conductive carrying board. The first voice coil is disposed between the first magnetic circuit module and the sidewall. The second voice coil is disposed between the second magnetic circuit module and the side magnetic conductive member. The first vibrating component is disposed at one side of the magnetic conductive carrying board. The first vibrating component comprises a first accommodating space in which the first magnetic circuit module and the first voice coil are disposed. The second vibrating component is disposed at the other side of the magnetic conductive carrying board. The second vibrating component comprises a second accommodating space in which the second magnetic circuit module and the second voice coil are disposed. The second accommodating space communicates with the first accommodating space. Wherein, an overall height of the sidewall is greater than or equal to an overall height of the first magnetic circuit module and/or the second magnetic circuit module.

In one of the embodiments, first vibrating component comprises a first support and a first diaphragm. The first support is disposed at the two sidewalls of the magnetic conductive carrying board. The first diaphragm is disposed at one side of the first support away from the sidewall and is connected to the first voice coil. The second vibrating component comprises a second support and a second diaphragm. The second support is disposed at the side magnetic conductive member. The second diaphragm is disposed at one side of the second support away from the side magnetic conductive member and is connected to the second voice coil.

In one of the embodiments, the double-sided speaker further comprises two auxiliary magnetic conductive members respectively disposed at the two sidewalls.

In one of the embodiments, two ends of each of the auxiliary magnetic conductive members comprise a bump. Each of the sidewalls comprises a recess relative to the bump. The bump is engaged with the recess.

In one of the embodiments, the first vibrating component comprises a first support and a first diaphragm. The first support is disposed at the two sidewalls and the two auxiliary magnetic conductive members of the magnetic conductive carrying board. The first diaphragm is disposed at one side of the first support away from the sidewall and is connected to the first voice coil. The second vibrating component comprises a second support and a second diaphragm. The second support is disposed at the side magnetic conductive member. The second diaphragm is disposed at one side of the second support away from the side magnetic conductive member and is connected to the second voice coil.

In one of the embodiments, the first magnetic circuit module further comprises a first magnet and a first magnetic conductive board. The first magnet is disposed at one side surface of the bottom plate. The first magnetic conductive board is disposed at one side of the first magnet away from the bottom plate. The second magnetic circuit module further comprises a second magnet and a second magnetic conductive board. The second magnet is disposed at the other side surface of the bottom plate. The second magnetic conductive board is disposed at one side of the second magnet away from the bottom plate.

In one of the embodiments, a height of each of the sidewalls is higher than a height of the first magnet or/and a height of the second magnet.

In one of the embodiments, a height of each of the side magnetic conductive members is higher than a height of the first magnet or/and a height of the second magnetic body.

In one of the embodiments, the side magnetic conductive member comprises a through hole. The second support comprises a securing column inserted in the through hole.

In one of the embodiments, one end of the securing column comprises a securing end. One end of the through hole comprises a securing hole matching with the securing end. When the securing column is inserted through the through hole, the securing end is embedded into the securing hole.

In one of the embodiments, the first support comprises a first docking component. The second support comprises a second docking component. The first docking component and the second docking component are oppositely disposed and are mutually connected and secured.

In one of the embodiments, the quantity of the side magnetic conductive members is two. Each of the side magnetic conductive members comprises a notch. Two side edges of the other side surface of the bottom plate are respectively engaged with the notches of the two side magnetic conductive members.

In one of the embodiments, the magnetic conductive carrying board further comprises a plurality of communication holes disposed at the bottom plate. The plurality of communication holes intercommunicate the first accommodating space and the second accommodating space.

In one of the embodiments, the plurality of communication holes are arranged along an arrangement direction of the sidewall.

In one of the embodiments, the plurality of communication holes are disposed at a position close to the sidewall.

In one of the embodiments, the double-sided speaker further comprises a first electrical connecting member and a second electrical connecting member. The first electrical connecting member is disposed at the first support and exposed from an outer surface of the first support. The first voice coil is electrically connected to the first electrical connecting member. The second electrical connecting member is disposed at the second support and exposed from an outer surface of the second support. The second voice coil is electrically connected to the second electrical connecting member.

In one of the embodiments, a position on the first support where the first electrical connecting member locates corresponds to a position on the second support where the second electrical connecting member locates.

In one of the embodiments, the first voice coil surrounds the first magnetic circuit module with a gap between them. The second voice coil surrounds the second magnetic circuit module with a gap between them.

In one of the embodiments, the sidewall and the bottom plate are integrally formed into one piece.

In one of the embodiments, the first accommodating space communicates with the second accommodating space through a front end and a rear end of the magnetic conductive carrying board.

In a second aspect, the present disclosure provides a double-sided speaker, comprising a magnetic conductive carrying board component, a first magnetic circuit module, a second magnetic circuit module, a first voice coil, a second voice coil, a first vibrating component, and a second vibrating component. The magnetic conductive carrying board component comprises a first magnetic conductive carrying board and a second magnetic conductive carrying board. The first magnetic conductive carrying board comprises two first sidewalls and a first bottom plate. The two first sidewalls are disposed at two sides of the first bottom plate. The second magnetic conductive carrying board comprises two second sidewalls and a second bottom plate. The two second sidewalls are disposed at two sides of the second bottom plate. Wherein, the first bottom plate and the second bottom plate form a plane. The two first sidewalls are disposed at two sides above the second bottom plate, and the two second sidewalls are disposed at two sides below the first bottom plate. The first magnetic circuit module is disposed at one side of the magnetic conductive carrying board component. The second magnetic circuit module is disposed at the other side of the magnetic conductive carrying board component. The first voice coil is disposed between the first magnetic circuit module and the two first sidewalls. The second voice coil is disposed between the second magnetic circuit module and the two second sidewalls. The first vibrating component is disposed at one side of the magnetic conductive carrying board component. The first vibrating component comprises a first accommodating space in which the first magnetic circuit module and the first voice coil are disposed. The second vibrating component is disposed at the other side of the magnetic conductive carrying board component. The second vibrating component comprises a first accommodating space in which the second magnetic circuit module and the second voice coil are disposed. Wherein, an overall height of the two first sidewalls and the two second sidewalls is greater than or equal to an overall height of the first magnetic circuit module and/or the second magnetic circuit module.

In one of the embodiments, the quantity of the first bottom plate is one. The quantity of the second bottom plate is one. The two first sidewalls extend toward two sides above the second bottom plate. The two first sidewalls and the first bottom plate form a U-shaped configuration. The two second sidewalls extend toward two sides below the first bottom plate. The two second sidewalls and the second bottom plate form a U-shaped configuration.

In one of the embodiments, the quantity of the first bottom plate is multiple. The quantity of the second bottom plate is multiple. Two adjacent first bottom plates are spaced apart by the second bottom plate. The two first sidewalls are disposed at two sides of the plurality of first bottom plates. Two adjacent second bottom plates are spaced apart by the first bottom plate. The two second sidewalls are disposed at two sides of the plurality of second bottom plates. The plurality of first bottom plates and the plurality of second bottom plates form a plane.

In one of the embodiments, the first vibrating component comprises a first support and a first diaphragm. The first support is disposed at the two first sidewalls of the first magnetic conductive carrying board. The first diaphragm is disposed at one side of the first support away from the two first sidewalls and is connected to the first voice coil. The second vibrating component comprises a second support and a second diaphragm. The second support is disposed at the two second sidewalls of the second magnetic conductive carrying board. The second diaphragm is disposed at one side of the second support away from the two second sidewalls and is connected to the second voice coil.

In one of the embodiments, the first magnetic circuit module further comprises a first magnet and a first magnetic conductive board. The first magnet is disposed at one side surface of the first bottom plate and the second bottom plate. The first magnetic conductive board is disposed at one side of the first magnet away from the first bottom plate and the second bottom plate. The second magnetic circuit module further comprises a second magnet and a second magnetic conductive board. The second magnet is disposed at the other side surface of the first bottom plate and the second bottom plate. The second magnetic conductive board is disposed at one side of the second magnet away from the first bottom plate and the second bottom plate.

In one of the embodiments, a height of each of the first sidewalls and the second sidewalls is higher than a height of the first magnet or/and a height of the second magnet.

In one of the embodiments, the first support comprises a first docking component. The second support comprises a second docking component. The first docking component and the second docking component are oppositely disposed and are mutually connected and secured.

In one of the embodiments, the double-sided speaker further comprises a first electrical connecting member and a second electrical connecting member. The first electrical connecting member is disposed at the first support and exposed from an outer surface of the first support. The first voice coil is electrically connected to the first electrical connecting member. The second electrical connecting member is disposed at the second support and exposed from an outer surface of the second support. The second voice coil is electrically connected to the second electrical connecting member.

In one of the embodiments, the double-sided speaker further comprises a plurality of elastic components comprising two first elastic members and two second elastic members. One side of the two first elastic members is respectively connected to two sides of the first voice coil. The other side of the two first elastic members is respectively connected to the first support. One side of the two second elastic members is respectively connected to two sides of the second voice coil. The other side of the two second elastic members is respectively connected to the second support.

In one of the embodiments, the magnetic conductive carrying board component further comprises a plurality of communication holes disposed at the first bottom plate and the second bottom plate. The plurality of communication holes intercommunicate the first accommodating space and the second accommodating space and are arranged along an arrangement direction of the first sidewall and the second sidewall.

In one of the embodiments, a position on the first support where the first electrical connecting member locates corresponds to a position on the second support where the second electrical connecting member locates.

In one of the embodiments, the first voice coil surrounds the first magnetic circuit module with a gap between them; the second voice coil surrounds the second magnetic circuit module with a gap between them.

In one of the embodiments, the first accommodating space communicates with the second accommodating space through a front end and a rear end of the magnetic conductive carrying board.

In one of the embodiments, the first bottom plate comprises a first convex surface. The second bottom plate comprises a second convex surface. The first convex surface and the second convex surface form a boss.

In one of the embodiments, the first bottom plate comprises a first bump or/and a first recess. The second bottom plate comprises a second recess or/and a second bump in correspondence with the first bump or/and the first recess of the first bottom plate. The first bump of the first bottom plate is engaged with the second recess of the second bottom plate or/and the first recess of the first bottom plate is engaged with the second bump of the second bottom plate.

In one of the embodiments, the magnetic conductive carrying board component comprises a plurality of ventilation holes. The first sidewall, the first bottom plate, and the second sidewall form the plurality of ventilation holes, the second sidewall, the second bottom plate, and the first sidewall form the plurality of ventilation holes, or/and the first sidewall, the first bottom plate, the second sidewall, and the second bottom plate form the plurality of ventilation holes.

In one of the embodiments, the plurality of ventilation holes are disposed at a position where the two first sidewalls and the first bottom plate are connected; the plurality of ventilation holes are disposed at a position where the two second sidewalls and the second bottom plate are connected.

In one of the embodiments, the first support of the first vibrating component comprises a first notch, and the second support of the second vibrating component comprises a second notch. The first notch corresponds to the second notch. The first notch corresponds to an upper edge of the plurality of ventilation holes of the magnetic conductive carrying board component. The second notch corresponds to a lower edge of the plurality of ventilation holes of the magnetic conductive carrying board component.

The present disclosure provides a double-sided speaker, wherein a first speaking part is formed by a magnetic conductive carrying board (or a magnetic conductive carrying board component), a first voice coil, a first magnetic circuit module, and a first vibrating component. A second speaking part is formed by a magnetic conductive carrying board and a side magnetic conductive member (or magnetic conductive carrying board component), a second voice coil, a second magnetic circuit module, and a second vibrating component. The first voice coil and the second voice coil speak respectively with the first magnetic circuit module and the second magnetic circuit module for double-sided speaking. The first accommodating space and the second accommodating space are respectively two resonant cavities of the double-sided speaker, where the two resonant cavities are mutually communicated. Thus, without upsizing the double-sided speaker, the size of the resonant cavity of the double-sided speaker can be enlarged to effectively improve the sounding quality for the double-sided speaker.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms “include”, “contain”, and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by “include a/an . . . ” does not exclude other same elements existing in the process, the method, the article, or the device which includes the element.

Figure 1:
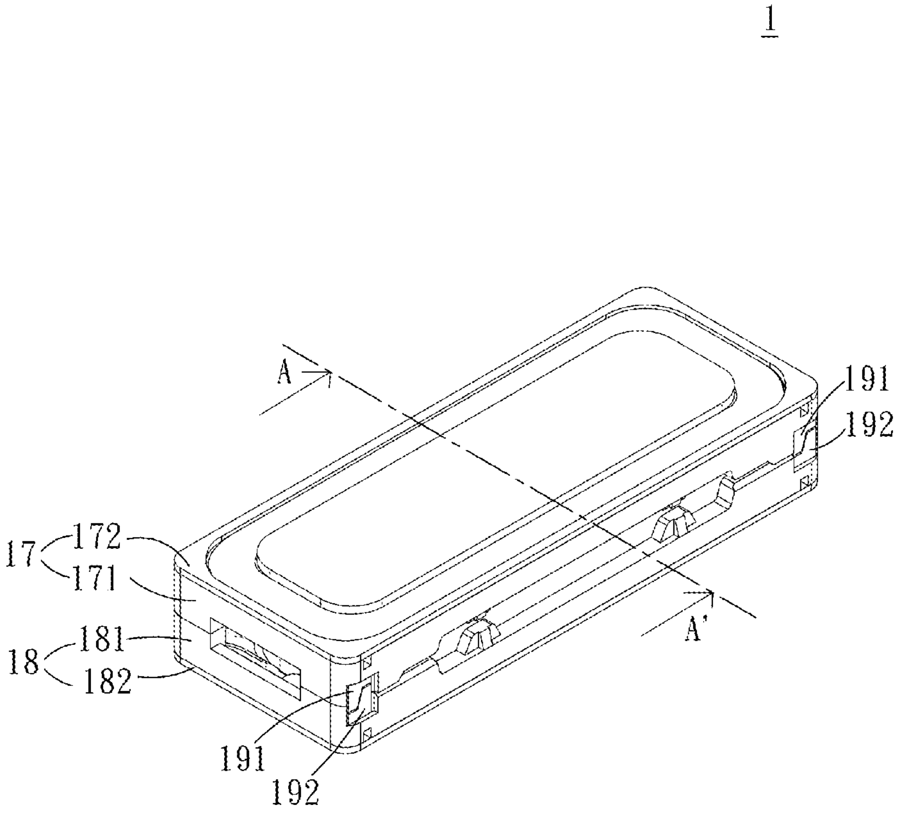
FIG. 1 is a perspective view of a double-sided speaker of the first embodiment of the present disclosure.
Figure 2:
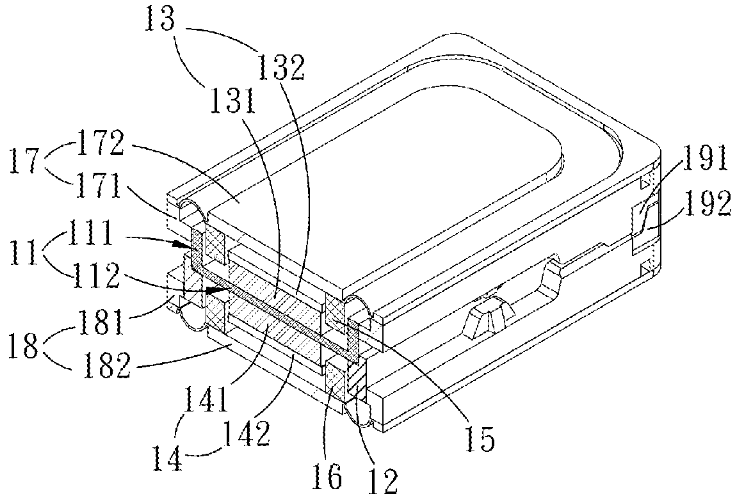
FIG. 2 is a sectional perspective view along line A-A' of FIG. 1.
Figure 3:
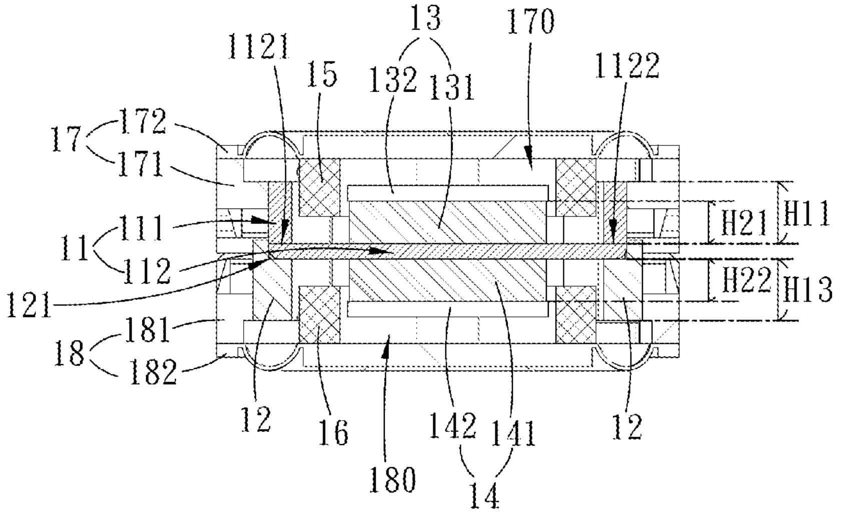
FIG. 3 is a cross-sectional view along line A-A' of FIG. 1.
Figure 4:
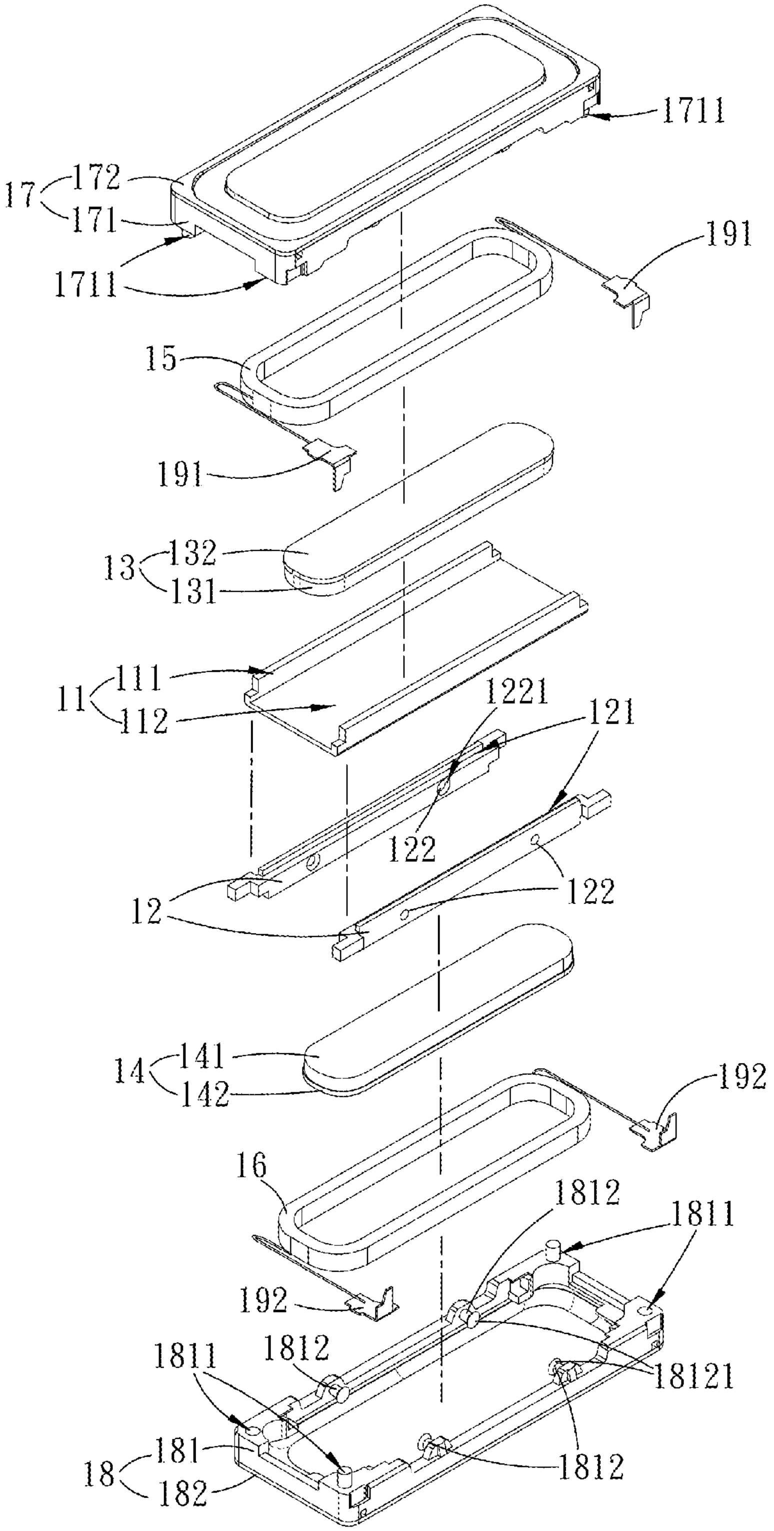
FIG. 4 is an exploded view of the double-sided speaker of the first embodiment of the present disclosure.

FIG. 1 is a perspective view of a double-sided speaker of the first embodiment of the present disclosure. FIG. 2 is a sectional perspective view along line A-A' of FIG. 1. FIG. 3 is a cross-sectional view along line A-A' of FIG. 1. FIG. 4 is an exploded view of the double-sided speaker of the first embodiment of the present disclosure. As shown in the figures, the present disclosure provides a double-sided speaker 1, which comprises a magnetic conductive carrying board 11, a side magnetic conductive member 12, a first magnetic circuit module 13, a second magnetic circuit module 14, a first voice coil 15, a second voice coil 16, a first vibrating component 17, and a second vibrating component 18. The magnetic conductive carrying board 11 comprises two sidewalls 111 and a bottom plate 112, where the two sidewalls 111 are disposed at two side edges of one side surface of the bottom plate 112. The side magnetic conductive member 12 is disposed at two side edges of the other side surface of the bottom plate 112. The first magnetic circuit module 13 is disposed at one side of the magnetic conductive carrying board 11. The second magnetic circuit module 14 is disposed at the other side of the magnetic conductive carrying board 11. The first voice coil 15 surrounds the first magnetic circuit module 13 with a gap between them and is disposed between the first magnetic circuit module 13 and the sidewall 111. The second voice coil 16 surrounds the second magnetic circuit module 14 with a gap between them and is disposed between the second magnetic circuit module 14 and the side magnetic conductive member 12. The first vibrating component 17 is disposed at one side of the magnetic conductive carrying board 11 and comprises a first accommodating space 170 in which the first magnetic circuit module 13 and the first voice coil 15 are disposed. The second vibrating component 18 is disposed at the other side of the magnetic conductive carrying board 11 and comprises a second accommodating space 180 in which the second magnetic circuit module 14 and the second voice coil 16 are disposed. The second accommodating space 180 communicates with the first accommodating space 170. Wherein, the first accommodating space 170 communicates with the second accommodating space 180 through a front end and a rear end of the magnetic conductive carrying board 11 without the sidewall 111. So, the air between the first vibrating component 17, and the second vibrating component 18 can be ventilated to generate and improve the effect of stereo resonance when operating.

In this embodiment, an overall height of the sidewall 111 of the magnetic conductive carrying board 11 is higher than or equal to an overall height of the first magnetic circuit module 13 and/or the second magnetic circuit module 14. In this embodiment, the overall height of the sidewall 111 may be higher than that of the first magnetic circuit module 13 and/or the second magnetic circuit module 14 as an example, but not limited thereto. Specifically, the number of the sidewalls of the magnetic conductive carrying board 11 is two. A side surface of the bottom plate 112 comprises a first side edge 1121 and a second side edge 1122 opposite to the first side edge 1121. The two sidewalls 111 are respectively disposed at the first side edge 1121 and the second side edge 1122 of the bottom plate 112. Wherein, the sidewall 111 and the bottom plate 112 can be integrally formed into one piece. Similarly, the number of the side magnetic conductive members 12 is two. The side magnetic conductive member 12 comprises a notch 121. Two side edges of the other side surface of the bottom plate 112 are respectively engaged with the notches 121 of the two side magnetic conductive members 12. The positions on the sidewall 111 and the side magnetic conductive member 12 relative to the two sides of the bottom plate 112 are in a correspondence relationship.

In addition, the first magnetic circuit module 13 further comprises a first magnet 131 and a first magnetic conductive board 132. The first magnet 131 is disposed at one side surface of the bottom plate 112, and the first magnetic conductive board 132 is disposed at one side of the first magnet 131 away from the bottom plate 112. The second magnetic circuit module 14 further comprises a second magnet 141 and a second magnetic conductive board 142. The second magnet 141 is disposed at the other side surface of the bottom plate 112, and the second magnetic conductive board 142 is disposed at one side of the second magnet 141 away from the bottom plate 112. Wherein, according to a height of the bottom plate 112 perpendicular to the magnetic conductive carrying board 11, a height H11 of the sidewall 111 is higher than a height H21 of the first magnet 131 or/and a height H22 of the second magnet 141. When the height H11 of the sidewall 111 of the magnetic conductive carrying board 11 is higher than the height H21 of the first magnet 131, it indicates that the sidewall 111 of the magnetic conductive carrying board 11 could cover most of the range of the magnetic field lines of the first magnet 131. Thus, the sidewall 111 of the magnetic conductive carrying board 11 could concentrate the magnetic field lines of the first magnet 131, so the first magnet 131 could generate a better magnetic field. Besides, a height H13 of the side magnetic conductive member 12 is higher than the height H21 of the first magnet 131 or/and the height H22 of the second magnet 141. When the height H13 of the side magnetic conductive member 12 is higher than the height H22 of the second magnet 141, it indicates that the magnetic conductive carrying board 11 and the side magnetic conductive member 12 could cover most of the range of the magnetic field lines of the second magnet 141, which also generate a better magnetic field.

Figure 5:
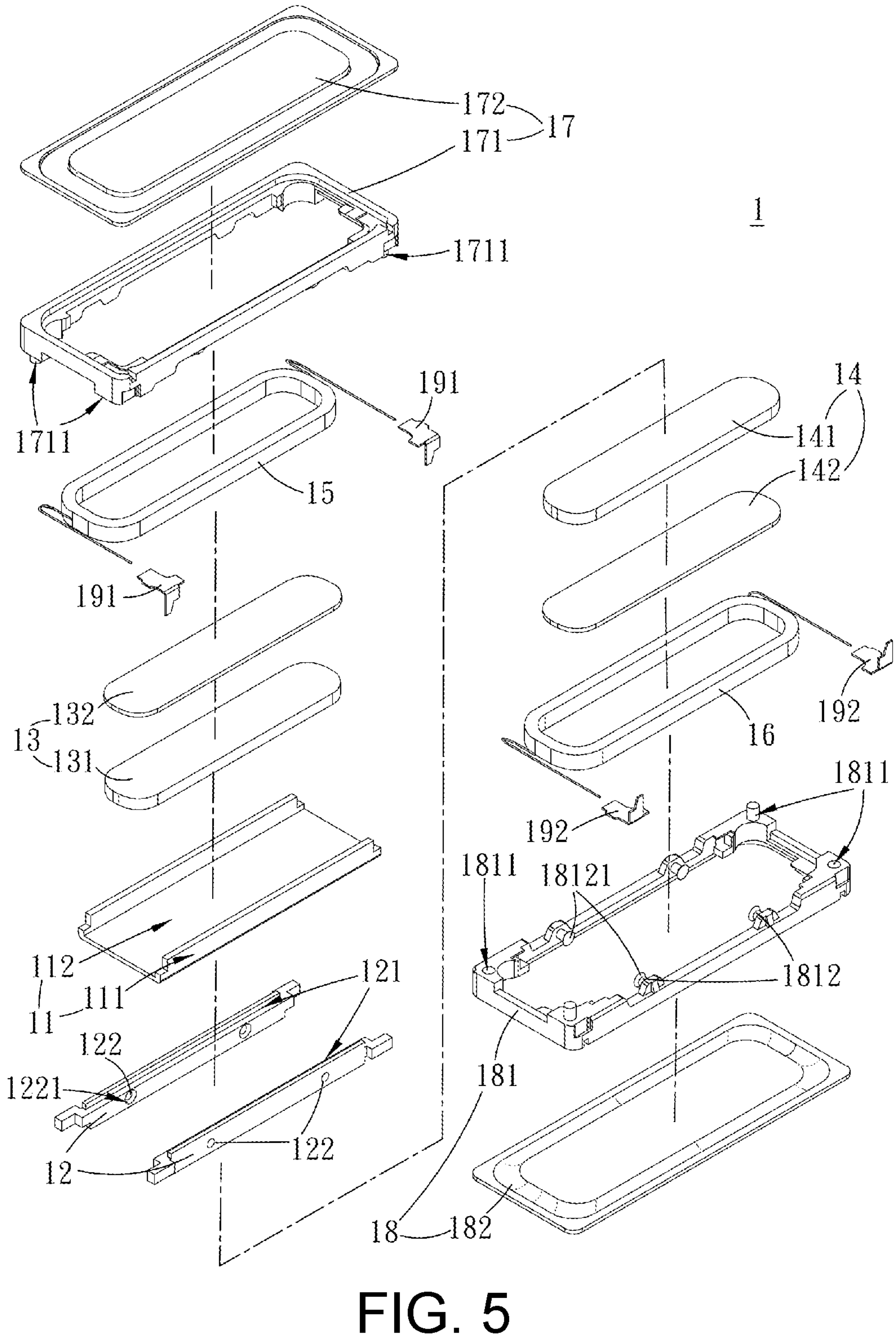
FIG. 5 is another exploded view of the double-sided speaker of the first embodiment of the present disclosure.

FIG. 5 is another exploded view of the double-sided speaker of the first embodiment of the present disclosure. As shown in the figure, in this embodiment, the first vibrating component 17 comprises a first support 171 and a first diaphragm 172. The first support 171 is disposed at one side of the magnetic conductive carrying board 11. The first diaphragm 172 is disposed at one side of the first support 171 away from the two sidewalls 111 and is connected to the first voice coil 15. The second vibrating component 18 comprises a second support 181 and a second diaphragm 182. The second support 181 is disposed at the other side of the magnetic conductive carrying board 11. The second diaphragm 182 is disposed at one side of the second support 181 away from the side magnetic conductive member 12 and is connected to the second voice coil 16. Wherein, the first support 171 is secured to the two sidewalls 111, and the second support 181 is secured to the two side magnetic conductive members 12.

Moreover, the first support 171 is disposed at the two sidewalls 111 of the magnetic conductive carrying board 11, and the second support 181 is disposed at the two side magnetic conductive members 12. Each side magnetic conductive member 12 comprises a through hole 122, and the second support 181 comprises a securing column 1812 inserted in the through hole 122. Wherein, one end of the securing column 1812 comprises a securing end 18121, one end of the through hole 122 comprises a securing hole 1221 matched with the securing end 18121. When the securing column 1812 is inserted in the through hole 122, the securing hole 18121 would be embedded in the securing hole 1221, where the securing end 18121 could restrict the side magnetic conductive member 12 to be detached from the securing column 1812.

Besides, the first support 171 comprises a first docking component 1711, and the second support 181 comprises a second docking component 1811 opposite to the first docking component 1711. The first support 171 is disposed on the second support 181. The first docking component 1711 is connected and secured to the second docking component 1811. Wherein, the first docking component 1711, and the second docking component 1811 can be columns or holes. The first docking component 1711 and the second docking component 1811 are oppositely disposed, so that the columns are embedded into the holes to strengthen the securing between the first support 171 and the second support 181.

In addition, in this embodiment, the double-sided speaker 1 further comprises a first electrical connecting member 191 and a second electrical connecting member 192. The first electrical connecting member 191 is disposed at the first support 171 and is exposed from an outer surface of the first support 171. The first voice coil 15 is electrically connected to the first electrical connecting member 191. The second electrical connecting member 192 is disposed at the second support 181 and is exposed from an outer surface of the second support 181. The second voice coil 16 is electrically connected to the second electrical connecting member 192. Wherein, a position on the first support 171 where the first electrical connecting member 191 locates corresponds to a position on the second support 181 where the second electrical connecting member 192 locates.

In this embodiment, an external power source supplies an electric current to the first voice coil 15 through the first electrical connecting member 191 and also supplies an electric current to the second voice coil 16 through the second electrical connecting member 192. The first voice coil 15 and the second voice coil 16 generate a magnetic field due to the electric current. In this way, the magnitude and direction of the magnetic field generated by the first voice coil 15 and the second voice coil 16 can be varied by changing the magnitude of the electric current in the first voice coil 15 and the second voice coil 16. The magnetic field of the first voice coil 15 interacts with the magnetic field of the first magnetic circuit module 13 so that the first voice coil 15 could vibrate orthogonally to the direction of the electric current. So, the first voice coil 15 drives the first diaphragm 172 to vibrate for sounding. Similarly, the magnetic field of the second voice coil 16 interacts with the magnetic field of the second magnetic circuit module 14, so that the second voice coil 16 could vibrate orthogonally to the direction of the electric current. So, the second voice coil 16 drives the second diaphragm 182 to vibrate for sounding. In this embodiment, a magnetic conductive carrying board 11, a first magnetic circuit module 13, a first voice coil 15, and a first vibrating component 17 form a first speaking part; a magnetic conductive carrying board 11, a second magnetic circuit module 14, a second voice coil 16, and a second vibrating component 18 form a second speaking part. Through the first a second speaking parts, a double-sided speaking can be achieved.

Furthermore, since the first voice coil 15 and the second voice coil 16 produce identical vibrating mass, the vibration of the double-sided speaker 1 can be reduced under mutual cancellation. So, the vibrating areas of the first diaphragm 172 and the second diaphragm 182 are increased, and the performance of the double-sided speaker 1 is improved. In addition, the first accommodating space 170 and the second accommodating space 180 in this embodiment are respectively two resonant cavities of the double-sided speaker 1, wherein the two resonant cavities are mutually communicated. In this way, the volume of the resonant cavities of the double-sided speaker 1 can be increased without increasing the size of the double-sided speaker 1, which can effectively improve the stereo sound quality of the double-sided speaker 1.

Figure 6:
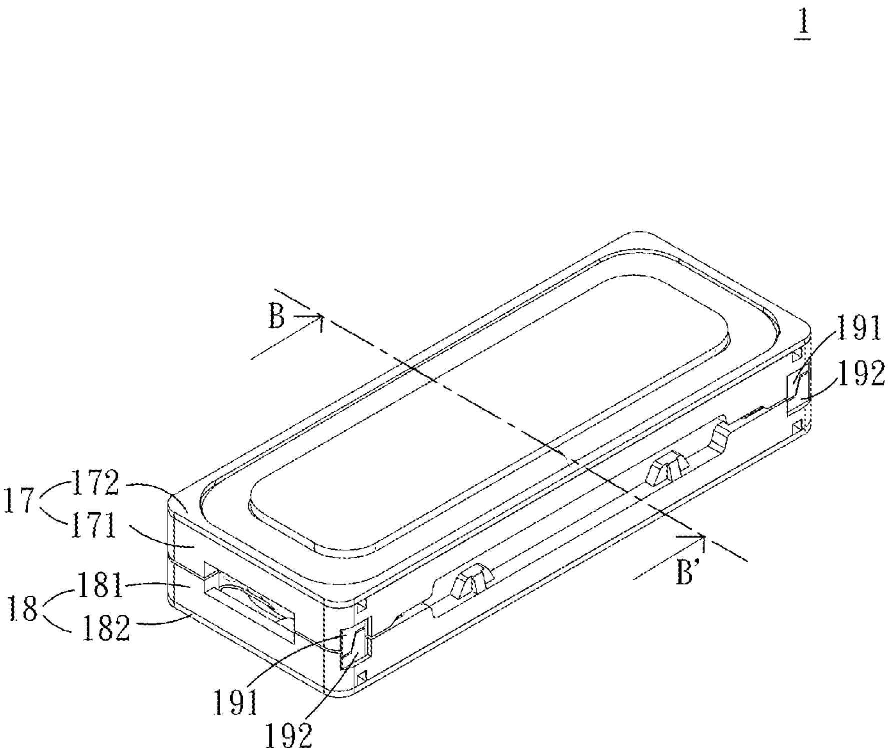
FIG. 6 is a perspective view of a double-sided speaker of the second embodiment of the present disclosure.
Figure 7:
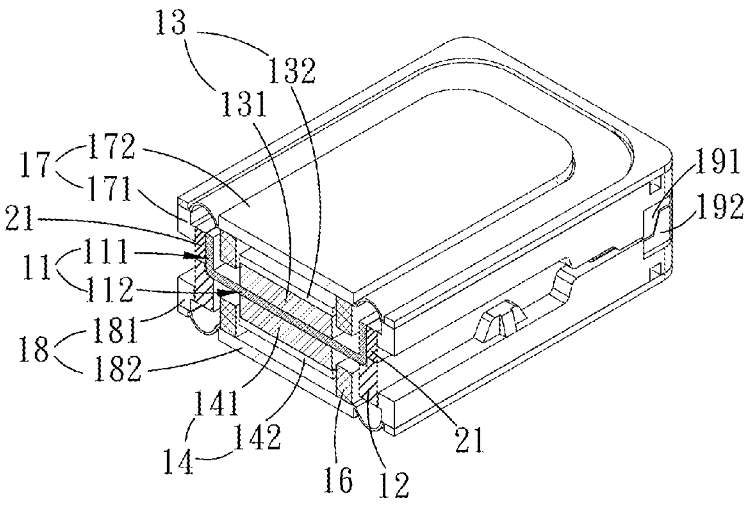
FIG. 7 is a sectional perspective view along line B-B' of FIG. 6.
Figure 8:
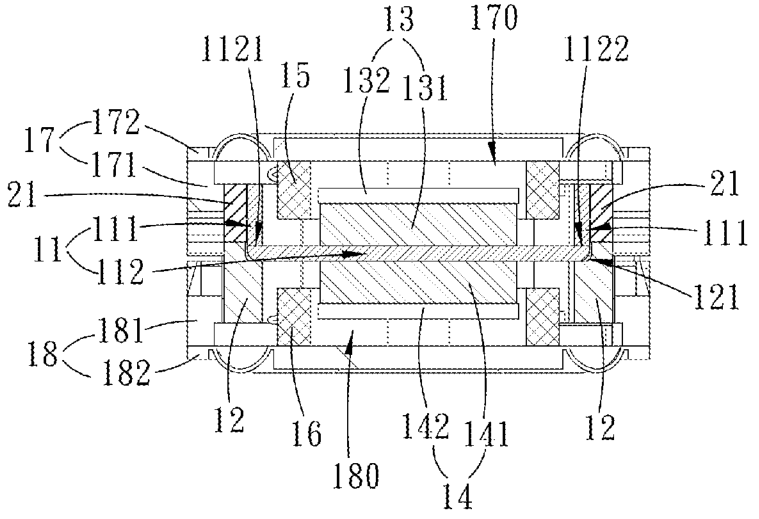
FIG. 8 is a cross-sectional view along line B-B' of FIG. 6.
Figure 9:
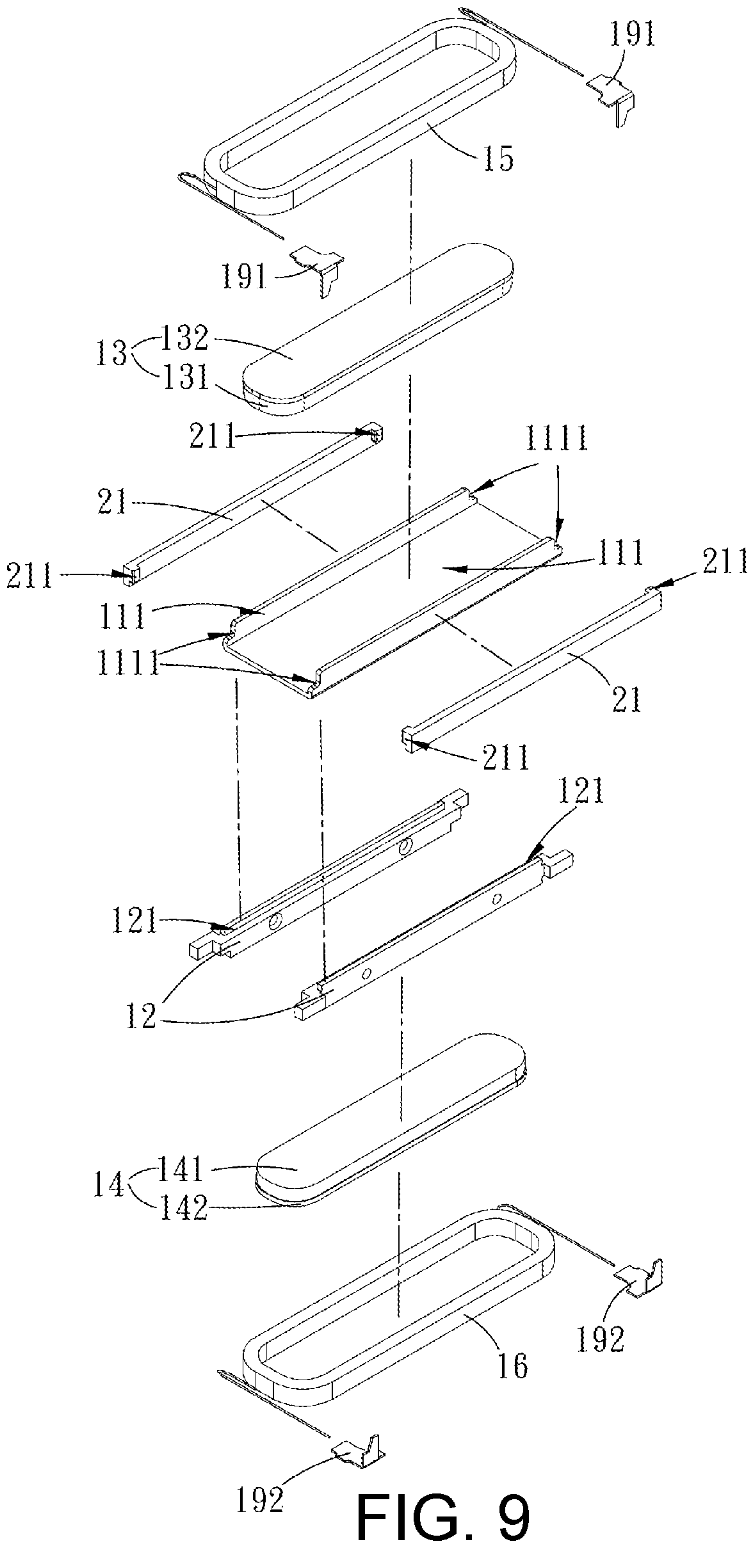
FIG. 9 is an exploded view of the internal configuration of the double-sided speaker of the second embodiment of the present disclosure.

FIG. 6 is a perspective view of a double-sided speaker of the second embodiment of the present disclosure. FIG. 7 is a sectional perspective view along line B-B' of FIG. 6. FIG. 8 is a cross-sectional view along line B-B' of FIG. 6. FIG. 9 is an exploded view of the internal configuration of the double-sided speaker of the second embodiment of the present disclosure. As shown in the figures, the difference between this embodiment and the first embodiment is that it further comprises two auxiliary magnetic conductive members 21, which are respectively disposed at two sidewalls 111. Wherein, two ends of each auxiliary magnetic conductive member 21 comprise a bump 211, each sidewall 111 comprises a recess 1111 relative to the bump 211, and the bump 211 of the auxiliary magnetic conductive member 21 is engaged with the recess 1111 of the sidewall 111. In this embodiment, since the auxiliary magnetic conductive members 21 are disposed at two sides of the magnetic conductive carrying board 11 and could concentrate the magnetic field lines of the magnetic conductive carrying board 11, the magnetic field generated by the first magnetic circuit module 13 can be enhanced. Besides, the first support 171 is disposed at the two sidewalls 111 of the magnetic conductive carrying board 11 and the two auxiliary magnetic conductive members 21, and the second support 181 is disposed at the side magnetic conductive member 12.

Figure 10:
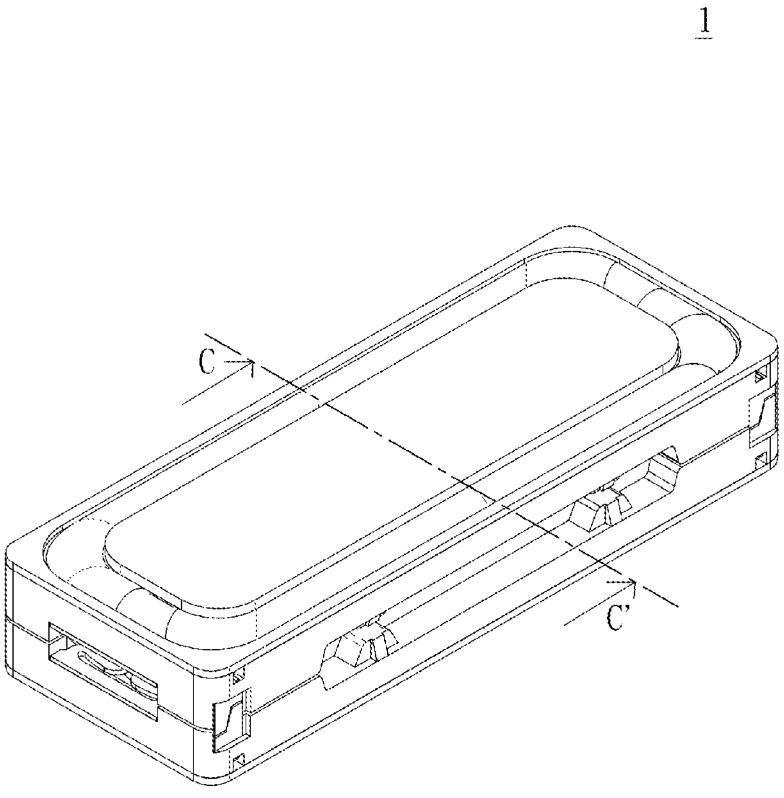
FIG. 10 is a perspective view of a double-sided speaker of the third embodiment of the present disclosure.
Figure 11:
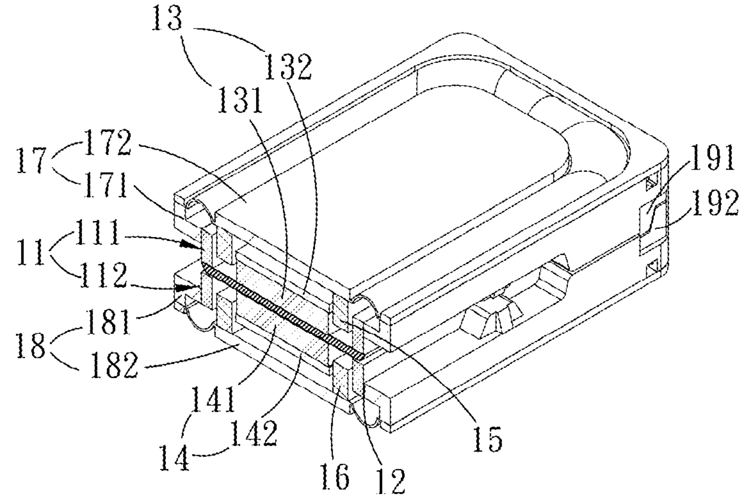
FIG. 11 is a sectional perspective view along line C-C' of FIG. 10.
Figure 12:
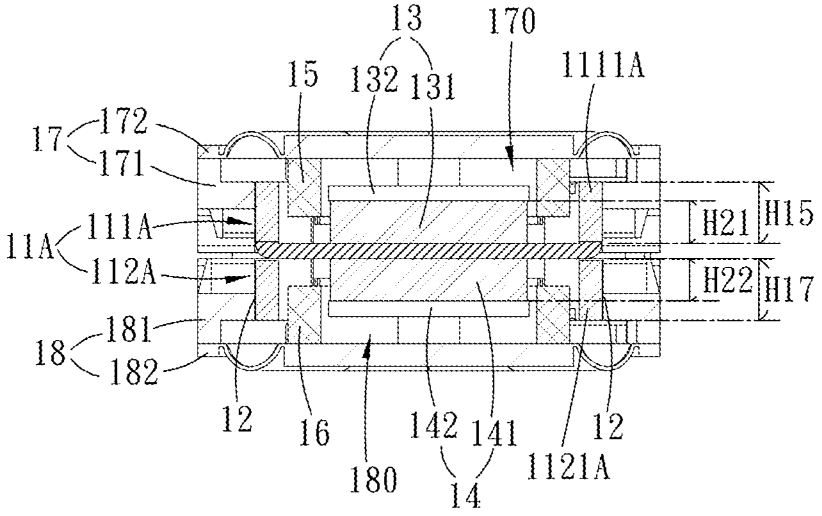
FIG. 12 is a cross-sectional view along line C-C' of FIG. 10.
Figure 13:
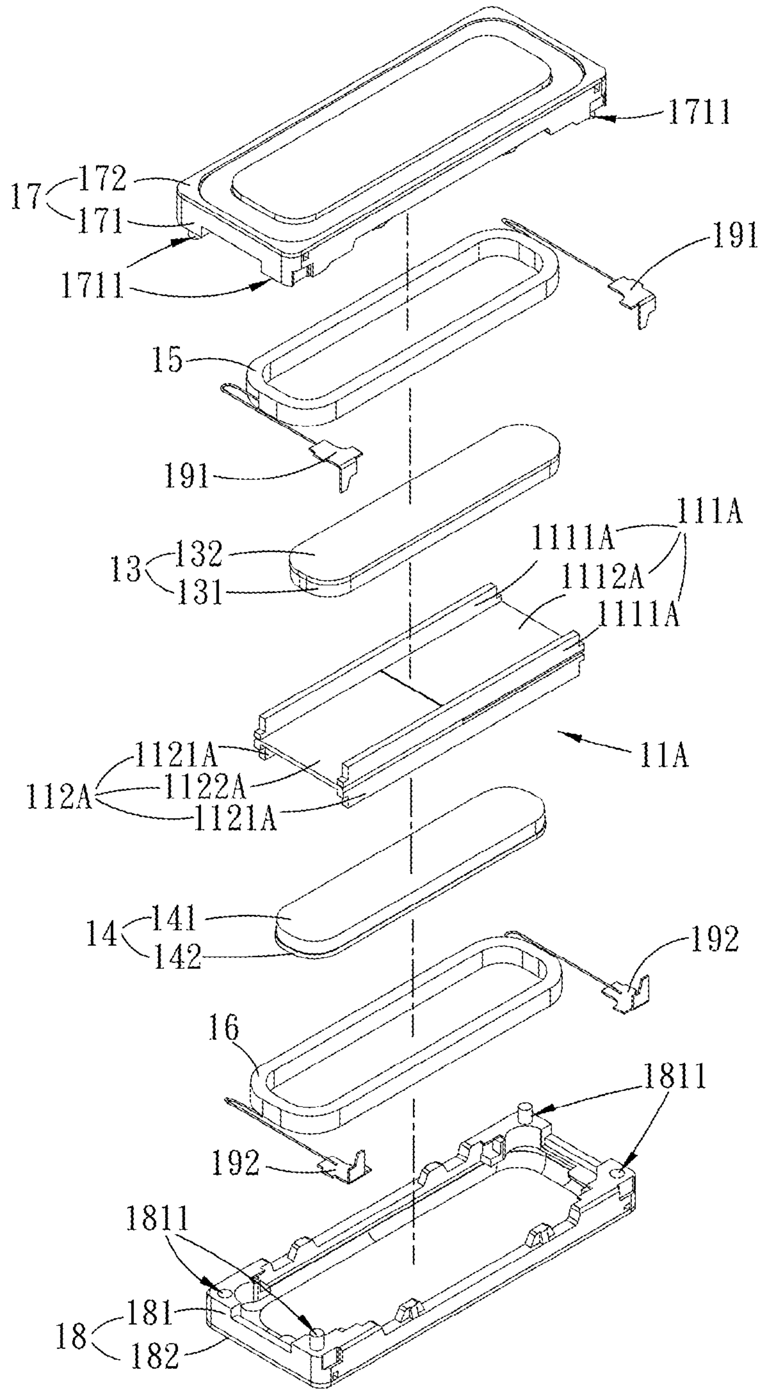
FIG. 13 is an exploded view of the double-sided speaker of the third embodiment of the present disclosure.
Figure 14:
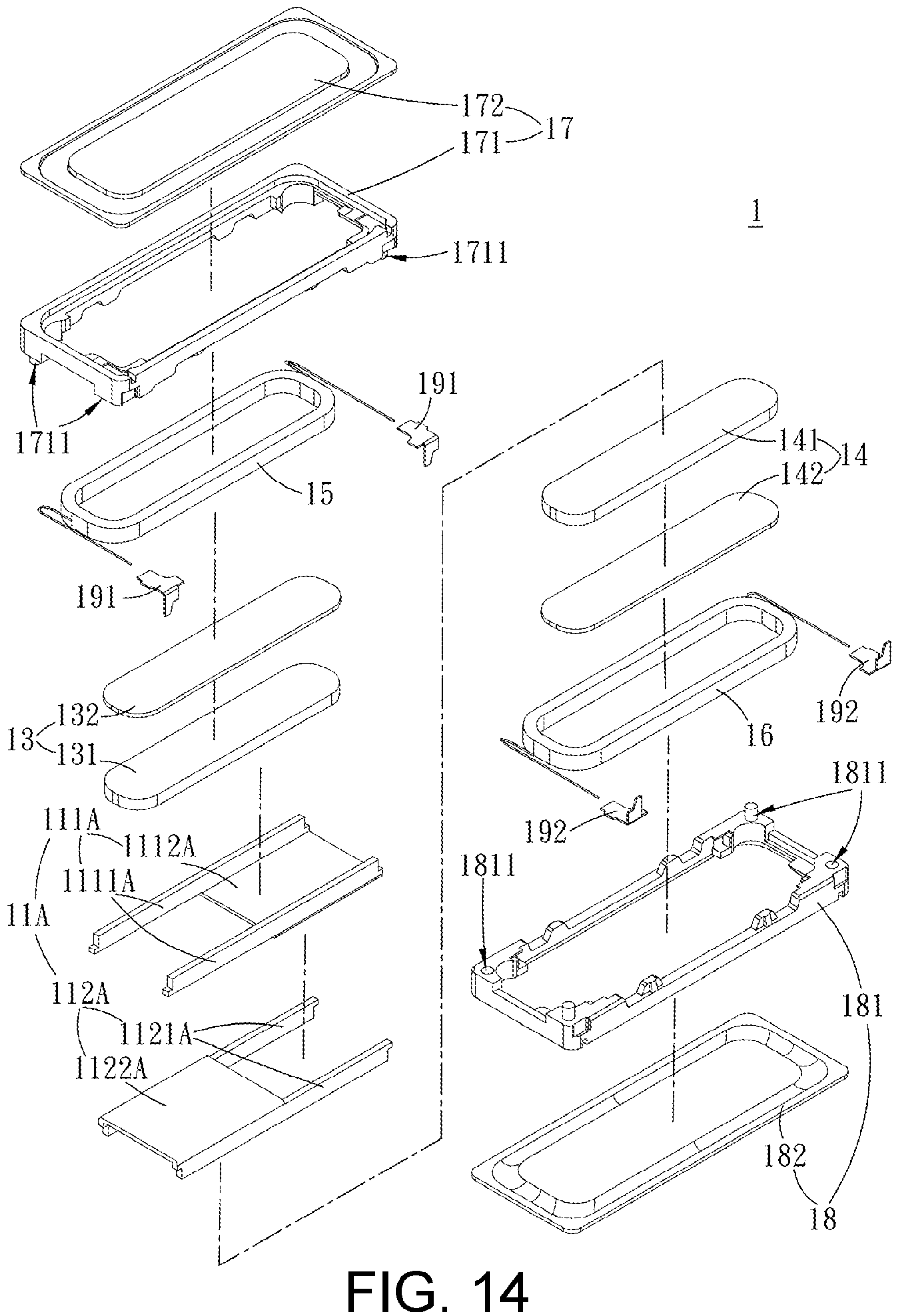
FIG. 14 is another exploded view of the double-sided speaker of the third embodiment of the present disclosure.

FIG. 10 is a perspective view of a double-sided speaker of the third embodiment of the present disclosure. FIG. 11 is a sectional perspective view along line C-C' of FIG. 10. FIG. 12 is a cross-sectional view along line C-C' of FIG. 10. FIG. 13 is an exploded view of the double-sided speaker of the third embodiment of the present disclosure. FIG. 14 is another exploded view of the double-sided speaker of the third embodiment of the present disclosure. As shown in the figures, the difference between this embodiment and the first embodiment is that the magnetic conductive carrying board component 11A replaces the combination of the magnetic conductive carrying board 11 and the side magnetic conductive member 12. In this embodiment, the double-sided speaker 1 comprises a magnetic conductive carrying board component 11A, a first magnetic circuit module 13, a second magnetic circuit module 14, a first voice coil 15, a second voice coil 16, a first vibrating component 17, and a second vibrating component 18. The magnetic conductive carrying board component 11A comprises a first magnetic conductive carrying board 111A and a second magnetic conductive carrying board 112A. The first magnetic conductive carrying board 111A comprises two first sidewalls 1111A and a first bottom plate 1112A, where the two first sidewalls 1111A are disposed at two sides of the first bottom plate 1112A. The second magnetic conductive carrying board 112A comprises two second sidewalls 1121A and a second bottom plate 1122A, where the two second sidewalls 1121A are disposed at two sides of the second bottom plate 1122A. Wherein, the first bottom plate 1112A and the second bottom plate 1122A form a plane, the two first sidewalls 1111A are disposed at two sides above the second bottom plate 1122A, and the two second sidewalls 1121A are disposed at two sides below the first bottom plate 1112A. The first magnetic circuit module 13 is disposed at one side of the magnetic conductive carrying board component 11A. The second magnetic circuit module 14 is disposed at the other side of the magnetic conductive carrying board component 11A. The first voice coil 15 surrounds the first magnetic circuit module 13 with a gap between them and is disposed between the first magnetic circuit module 13 and the two first sidewalls 1111A. The second voice coil 16 surrounds the second magnetic circuit module 14 with a gap between them and is disposed between the second magnetic circuit module 14 and the two second sidewalls 1121A.

Furthermore, the first vibrating component 17 is disposed at one side of the magnetic conductive carrying board component 11A and comprises a first accommodating space 170 in which the first magnetic circuit module 13 and the first voice coil 15 are disposed. The second vibrating component 18 is disposed at the other side of the magnetic conductive carrying board component 11A and comprises a second accommodating space 180 in which the second magnetic circuit module 14 and the second voice coil 16 are disposed. The second accommodating space 180 communicates with the first accommodating space 170. The first accommodating space 170 and the second accommodating space 180 are mutually communicated through the front and rear ends on the magnetic conductive carrying board component 11A not having the two first sidewalls 1111A and the two second sidewalls 1121A.

In this embodiment, as shown in FIG. 14, the first magnetic conductive carrying board 111A has the same configuration as the second magnetic conductive carrying board 112A. The quantity of the first bottom plate 1112A is one, and the two first sidewalls 1111A are disposed at two sides of the first bottom plate 1112A. The two first sidewalls 1111A extend toward two sides above the second bottom plate 1122A and horizontally protrude from a surface of the first bottom plate 1112A. The length of the two first sidewalls 1111A protruding from the first bottom plate 1112A is equal to the length of the second bottom plate 1122A. The two first sidewalls 1111A and the first bottom plate 1112A form a U-shaped configuration. The quantity of the second bottom plate 1122A is one, and the two second side walls 1121A are disposed at two sides of the second bottom plate 1122A. The two second sidewalls 1121A extend toward two sides below the first bottom plate 1112A and horizontally protrude from a surface of the second bottom plate 1122A. The length of the two second sidewalls 1121A protruding from the second bottom plate 1122A is equal to the length of the first bottom plate 1112A. The two second sidewalls 1121A and the second bottom plate 1122A form a U-shaped configuration. Wherein, the two first sidewalls 1111A and the first bottom plate 1112A are integrally formed to one piece, and the two second sidewalls 1121A and the second bottom plate 1122A are integrally formed to one piece. The first magnetic conductive carrying board 111A is disposed reverse to and oppositely assembled with the second magnetic conductive carrying board 112A. The first bottom plate 1112A and the second bottom plate 1122A form a common plane for supporting the first magnetic circuit module 13 and the second magnetic circuit module 14. In addition, the two first sidewalls 1111A are upper sidewalls shared by the first bottom plate 1112A and the second bottom plate 1122A, and the two second sidewalls 1121A are lower sidewalls shared by the first bottom plate 1112A and the second bottom plate 1122A, so the structural strength of the magnetic conductive carrying board component 11A can be strong. Also, the structural configuration of the first magnetic conductive carrying board 111A and the second magnetic conductive carrying board 112A are identical, which is convenient for manufacturing without additional mold preparation work to lower manufacturing costs.

Furthermore, in this embodiment, as shown in FIG. 12, an overall height of the two first sidewalls 1111A and the two second sidewalls 1121A is higher than or equal to an overall height of the first magnetic circuit module 13 and/or the second magnetic circuit module 14. This embodiment may be, but is not limited to, an example where the overall height of the two first sidewalls 1111A and the two second sidewalls 1121A is higher than the first magnetic circuit module 13 and/or the second magnetic circuit module 14. Specifically, the first support 171 of the first vibrating component 17 is secured to the two first sidewalls 1111A, and the second support 181 is secured to the two side magnetic conductive members 12. The second supports 181 of the second vibrating component 18 are secured to the two second sidewalls 1121A. Also, the first magnet 131 of the first magnetic circuit module 13 is disposed at one side surface of the first bottom plate 1112A and the second bottom plate 1122A, and the second magnet 141 of the second magnetic circuit module 14 is disposed at the other side surfaces of the first bottom plate 1112A and the second bottom plate 1122A. Wherein, a height H15 of each first sidewall 1111A and a height H17 of each second sidewall 1121A are higher than the height H21 of the first magnet 131 or/and the height H22 of the second magnet 141. With the above-mentioned configuration, the first magnetic circuit module 13, the second magnetic circuit module 14, the first voice coil 15, and the second voice coil 16 can work in a stable electromagnetic field.

In addition, in this embodiment, the configuration of the first magnetic circuit module 13, the second magnetic circuit module 14, the first voice coil 15, the second voice coil 16, the first vibrating component 17, the second vibrating component 18, the first electrical connecting member 191, and the second electrical connecting member 192 is identical to the arrangement and structural effect of the first embodiment and the second embodiment described above, so it would not be repeated here.

Figure 15:
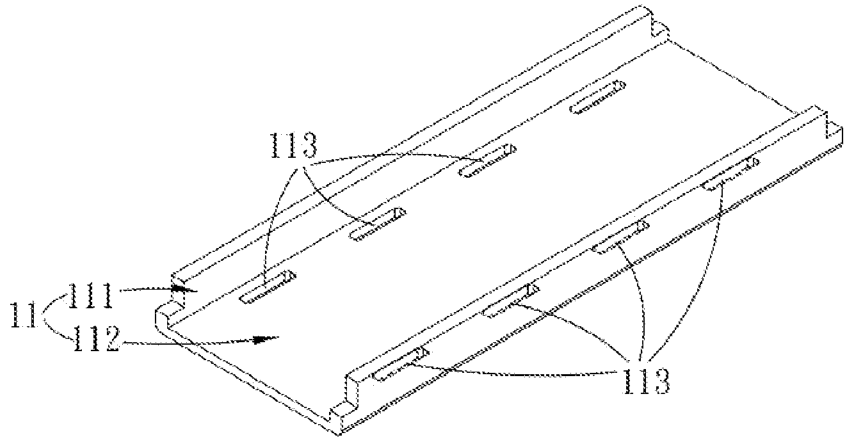
FIG. 15 shows a perspective view of a magnetic conductive carrying board having a plurality of communication holes of the present disclosure.

FIG. 15 shows a perspective view of a magnetic conductive carrying board having a plurality of communication holes of the present disclosure. As shown in the figure, the difference in the structural configuration of the bottom plate 112 of the magnetic conductive carrying board 11 in this embodiment compared to the first embodiment and the second embodiment is that it further comprises a plurality of communication holes 113. The plurality of communication holes 113 are disposed at the bottom plate 112 and intercommunicated with the first accommodating space 170 and the second accommodating space 180. The plurality of communication holes 113 enhances the resonance of the first accommodating space 170 and the second accommodating space 180, that is, the vibrating air flow during operation ventilates between the first accommodating space 170 and the second accommodating space 180. Wherein, the plurality of communication holes 113 are arranged at intervals along the arrangement direction of the sidewall 111 and are close to the sidewall 111. This embodiment does not limit the configuration and arrangement of the communication holes 113 at the bottom plate 112, and the arrangement can be adjusted according to requirements.

Figure 16:
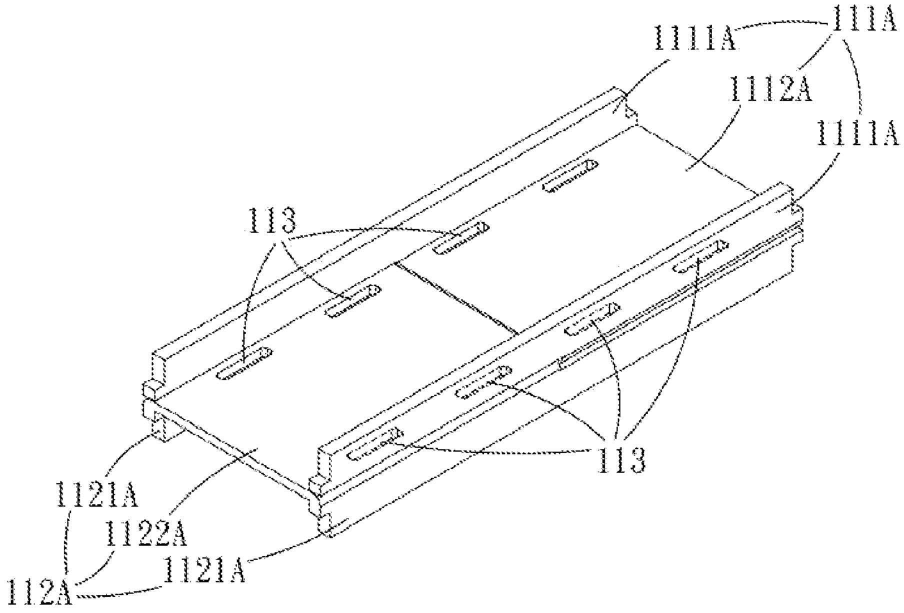
FIG. 16 shows a perspective view of a magnetic conductive carrying board component having a plurality of communication holes of the present disclosure.

FIG. 16 shows a perspective view of a magnetic conductive carrying board component having a plurality of communication holes of the present disclosure. The difference between this embodiment and the structural configuration of the first bottom plate 1112A of the first magnetic conductive carrying board 111A and the second bottom plate 1122A of the second magnetic conductive carrying board 112A in the third embodiment is that it further comprises a plurality of communication holes 113. The plurality of communication holes 113 are disposed at the first bottom plate 1112A and the second bottom plate 1122A and intercommunicated with the first accommodating space 170 and the second accommodating space 180. The plurality of communication holes 113 enhances the resonance of the first accommodating space 170 and the second accommodating space 180, that is, the vibrating air flow during operation ventilates between the first accommodating space 170 and the second accommodating space 180. Wherein, the plurality of communication holes 113 are arranged at intervals along the arrangement direction of the first sidewall 1111A and the second sidewall 1121A and are close to the first sidewall 1111A or/and the second sidewall 1121A. This embodiment does not limit the configuration and arrangement of the communication holes 113 at the first bottom plate 1112A and the second bottom plate 1122A, and the arrangement can be adjusted according to requirements.

Figure 17:
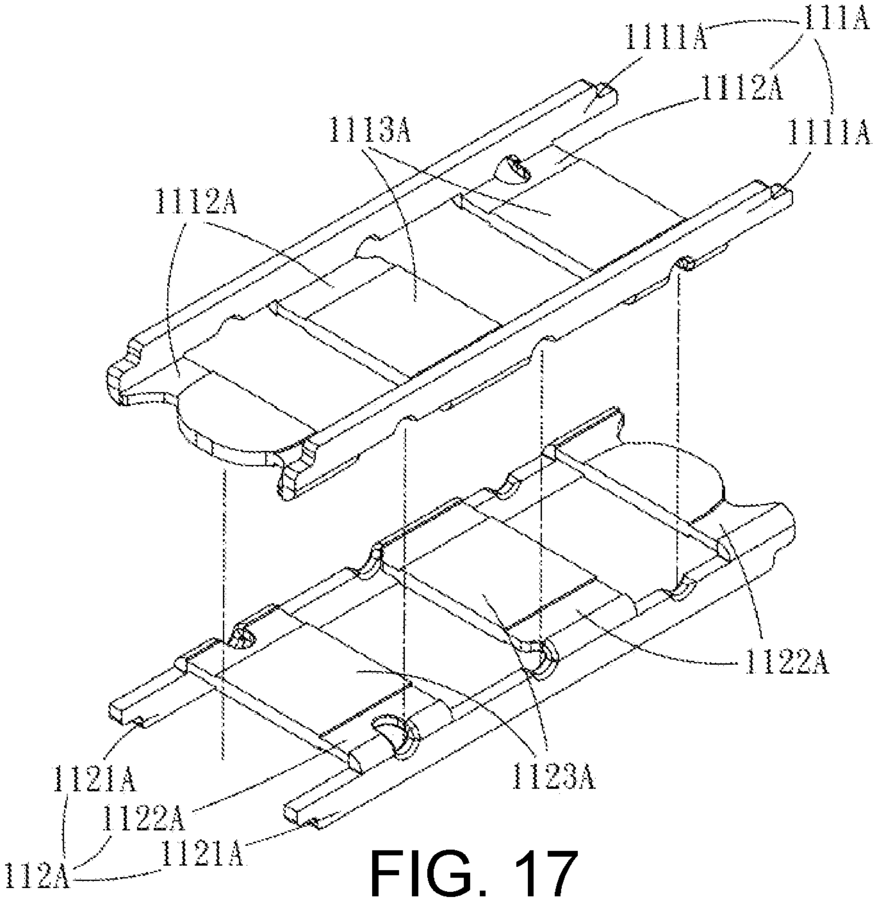
FIG. 17 is an exploded view of the magnetic conductive carrying board component of the present disclosure.
Figure 18:
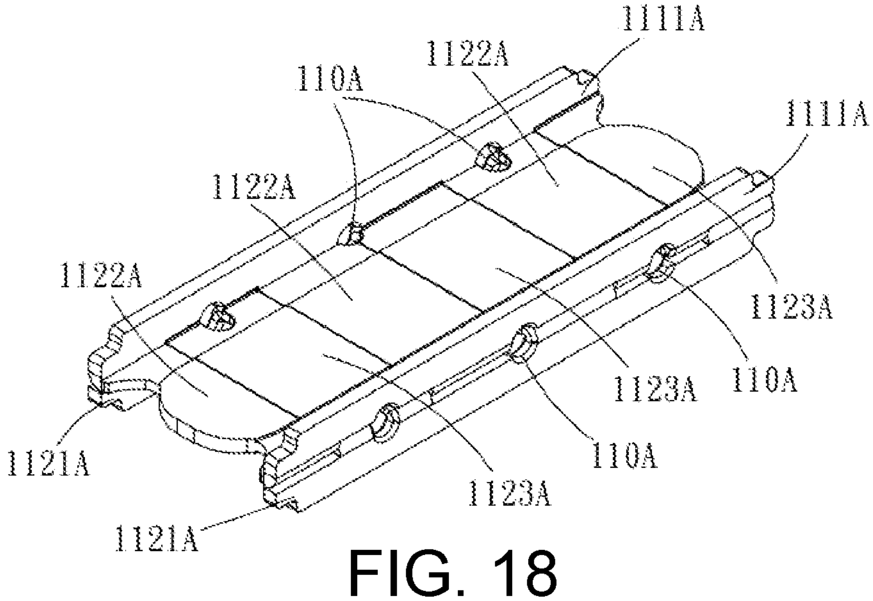
FIG. 18 shows the magnetic conductive carrying board component after being assembled of the present disclosure.

FIG. 17 is an exploded view of the magnetic conductive carrying board component of the present disclosure. FIG. 18 shows the magnetic conductive carrying board component after being assembled of the present disclosure. As shown in the figures, in another embodiment, the quantity of the first bottom plate 1112A is multiple, and the quantity of the second bottom plate 1122A is multiple. Two adjacent first bottom plates 1121A are spaced apart by the second bottom plate 1122A, and the two first sidewalls 1111A are disposed at two sides of the plurality of first bottom plates 1112A. Two adjacent second bottom plates 1122A are spaced apart by the first bottom plate 1112A, and the two second sidewalls 1121A are disposed at two sides of the plurality of second bottom plates 1122A. The plurality of first bottom plates 1112A and the plurality of second bottom plates 1122A form a plane for supporting the first magnetic circuit module 13 and the second magnetic circuit module 14.

The first bottom plate 1112A comprises a first convex surface 1113A, the second bottom plate 1122A comprises a second convex surface 1123A, and the first convex surface 1113A and the second convex surface 1123A form a boss. Wherein, the first convex surface 1113A is disposed on an upper surface or/and a lower surface of the first bottom plate 1112A, and the second convex surface 1123A is disposed on an upper surface or/and a lower surface of the second bottom plate 1122A relative to the first convex surface. The above-mentioned boss configuration can be single-sided or double-sided according to requirements. In this embodiment, the boss can be connected between the plurality of first bottom plates 1112A and the plurality of second bottom plates 1122A to increase structural thickness for the combined components to enhance the structural strength of the combination of the plurality of first bottom plates 1112A of the first magnetic conductive carrying board 111A and the plurality of second bottom plates 1122A of the second magnetic conductive carrying board 112A. The boss configuration of this embodiment can also be applied to the combined configuration of a single first bottom plate 1112A and a single second bottom plate 1122A, which also enhances the structural strength.

Figure 19:
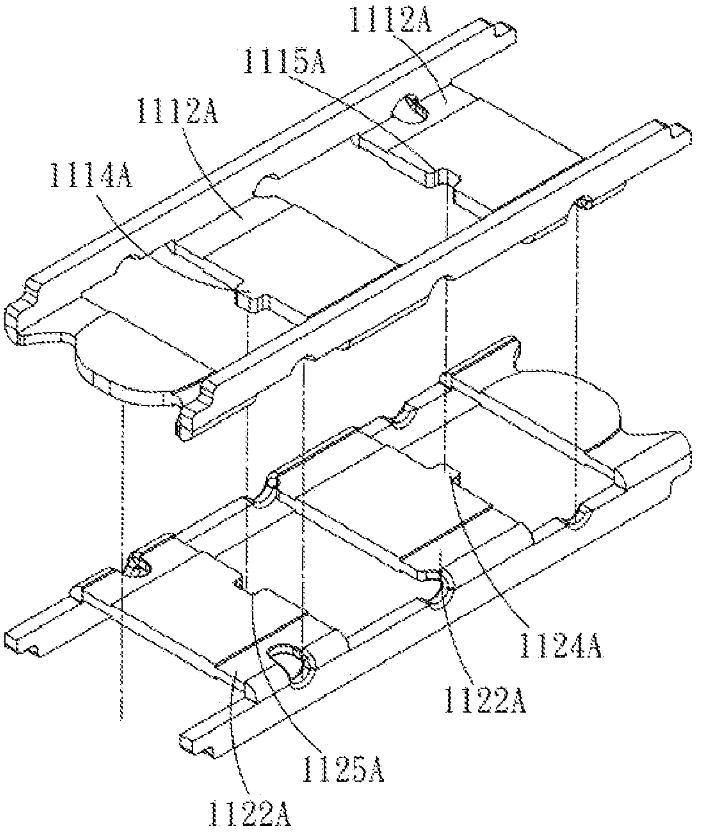
FIG. 19 is another exploded view of the magnetic conductive carrying board component of the present disclosure.
Figure 20:
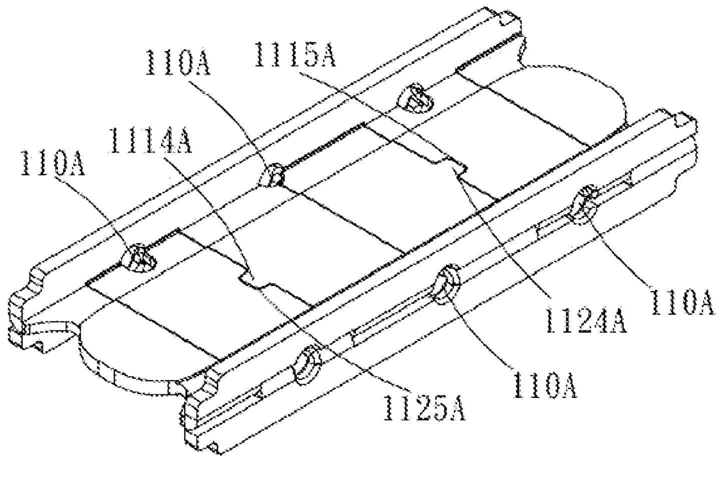
FIG. 20 shows another magnetic conductive carrying board component after being assembled of the present disclosure.

FIG. 19 is another exploded view of the magnetic conductive carrying board component of the present disclosure. FIG. 20 shows another magnetic conductive carrying board component after being assembled of the present disclosure. As shown in the figures, in this embodiment further, a connecting component is added to the first bottom plate 1112A and the second bottom plate 1122A. The first bottom plate 1112A comprises a first bump 1114A or/and a first recess 1115A, and the second bottom plate 1122A comprises a second recess 1125A or/and a second bump 1124A corresponding to the first bump 1114A or/and the first recess 1115A of the first bottom plate 1112A. The first bump 1114A of the first bottom plate 1112A is combined with the second recess 1125A of the second bottom plate 1122A or/and the first recess 1115A of the first bottom plate 1112A is combined with the second bump 1124A of the second bottom plate 1122A. In the above manner, the connecting strength between the plurality of first bottom plates 1112A of the first magnetic conductive carrying board 111A and the plurality of second bottom plates 1122A of the second magnetic conductive carrying board 112A can be enhanced. In this embodiment, the shape of the connecting configuration that fits between the first bottom plate 1112A, and the second bottom plate 1122A is not limited. For example, jagged side edges with jagged notches, or wavy side edges with wavy notches, etc., can be matched with each other for connection or assembling. So, the first bottom plate 1112A and the second bottom plate 1122A can form a plane, that is, the connecting strength between the plurality of first bottom plates 1112A of the first magnetic conductive carrying board 111A and the plurality of second bottom plates 1122A of the second magnetic conductive carrying board 112A can be improved. The above-mentioned embodiments can be adjusted according to requirements.

Moreover, the magnetic conductive carrying board component 11A comprises a plurality of ventilation holes 110A. The plurality of ventilation holes 110A is formed by the first sidewall 1111A, the first bottom plate 1112A, and the second sidewall 1121A, or by the second sidewall 1121A, the second bottom plate 1122A, and the first sidewall 1111A or/and the first sidewall 1111A, the first bottom plate 1112A, the second sidewall 1121A, and the second bottom plate 1122A. The ventilation holes 110A o this embodiment is assembled by the above-mentioned components, each ventilation hole 110A is intercommunicated with the first accommodating space 170, the second accommodating space 180, and an outer space of the magnetic conductive carrying board component 11A, and is improving the resonance of the first accommodating space 170, the second accommodating space 180, and the outer space of the magnetic conductive carrying board component 11A. That is, during operation, the airflow can be vibrated to circulate between the first accommodating space 170, the second accommodating space 180, and the outer space of the magnetic conductive carrying board component 11A. In this embodiment, the configuration and arrangement of the ventilation holes 110A are not limited, and can be adjusted according to requirements. Furthermore, the ventilation holes 110A of this embodiment can also be applied to the double-sided speaker 1 of the foregoing embodiments to allow the vibrated air flow to circulate between the first accommodating space 170, the second accommodating space 180, and the outer space of the magnetic conductive carrying board component 11A.

It should be further explained that, as shown in FIG. 17 and FIG. 18, the plurality of ventilation holes 110A are disposed at the positions where the two first sidewalls 1111A and the first bottom plate 1112A are connected, i.e., the joints at the corners. The plurality of ventilation holes 110A are disposed at the positions where the two second sidewalls 1121A and the second bottom plate 1122A are connected, i.e., the joints at the corners. However, the ventilation holes 110A between the two first sidewalls 1111A and the first bottom plate 1112A can be matched with the ventilation holes 110A between the two second side walls 1121A and the second bottom plate 1122A to form a ventilation hole 110A having a larger venting area.

Figure 22:
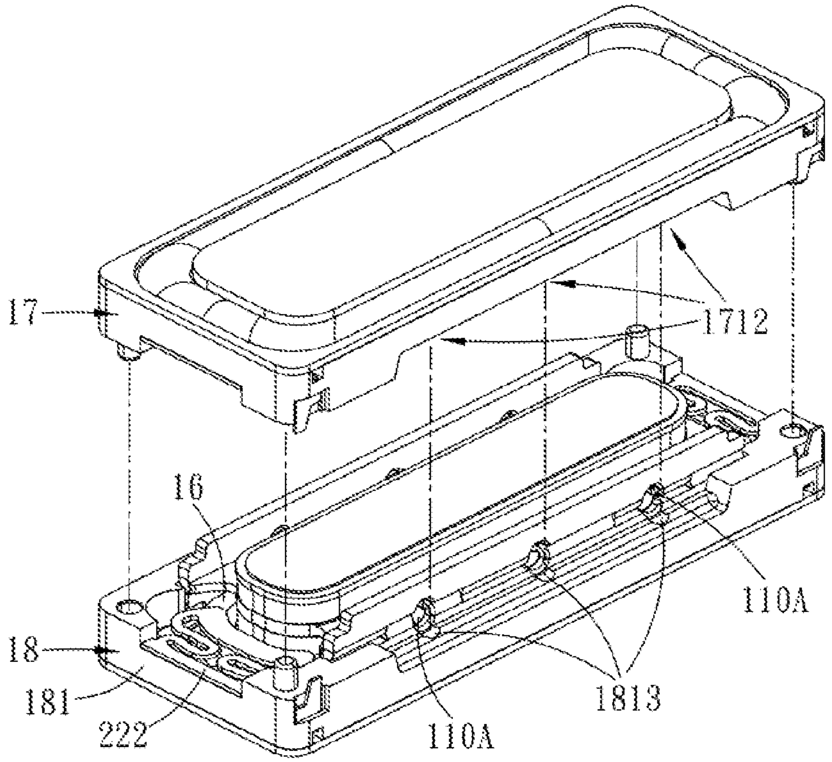
FIG. 22 shows the assembling of the elastic sheet component of the double-sided speaker of the present disclosure.
Figure 23:
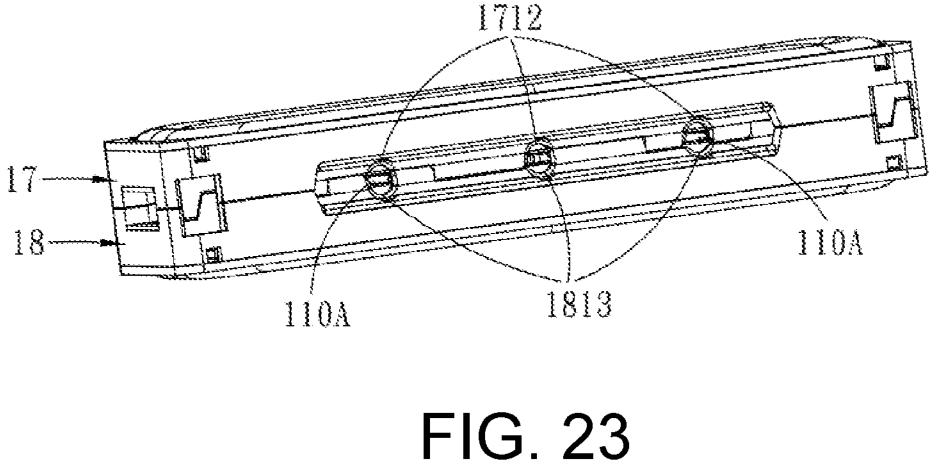
FIG. 23 is a perspective view of the elastic sheet component of the double-sided speaker of the present disclosure.

Back to FIG. 22 and FIG. 23, the first support 171 of the first vibrating component 17 comprises a first notch 1712 (a component identical to that of the second notch 1813 shown in the figure), and the second support 181 of the second vibrating component 18 comprises a second notch 1813. The first notch 1712 and the second notch 1813 are structurally identical and the positions thereof are mutually corresponded. The first notch 1712 corresponds to an upper edge of the plurality of ventilation holes 110A of the magnetic conductive carrying board component 11A, and the second notch 1813 corresponds to a lower edge of the plurality of ventilation holes 110A of the magnetic conductive carrying board component 11A. In this way, the first notch 1712, and the second notch 1813 could facilitate the air flowing through the plurality of ventilation holes 110A.

Figure 21:
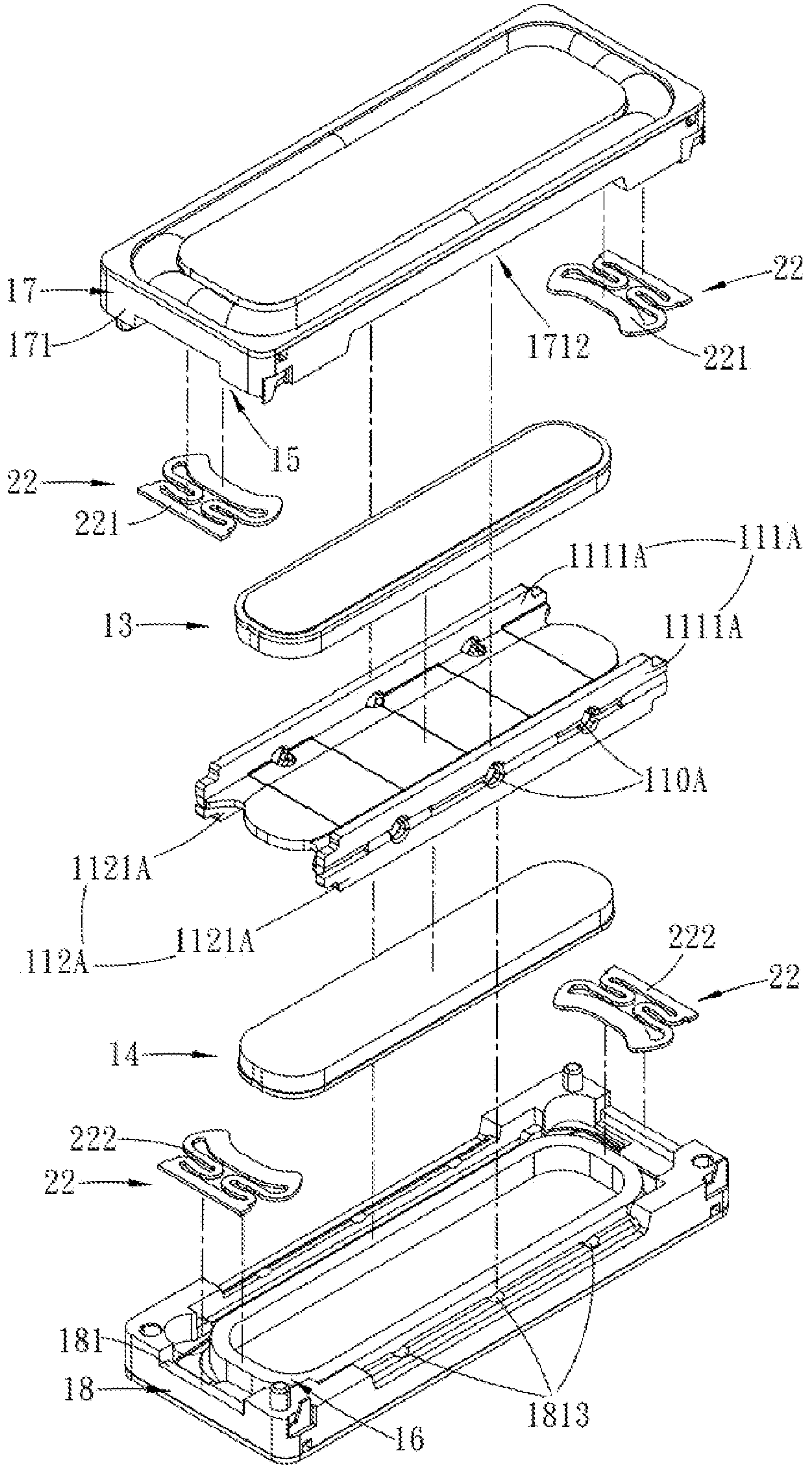
FIG. 21 is an exploded view of an elastic sheet component of the double-sided speaker of the present disclosure.

FIG. 21 is an exploded view of an elastic sheet component of the double-sided speaker of the present disclosure. FIG. 22 shows the assembling of the elastic sheet component of the double-sided speaker of the present disclosure. FIG. 23 is a perspective view of the elastic sheet component of the double-sided speaker of the present disclosure. As shown in the figures, in this embodiment, the double-sided speaker 1 further comprises a plurality of elastic components 22 comprising two first elastic members 221 and two second elastic members 222. One side of the two first elastic members 221 is respectively connected to two sides of the first voice coil 15. The other side of the two first elastic members 221 is respectively connected to the first support 171. One side of the two second elastic members 222 is respectively connected to two sides of the second voice coil 16. The other side of the two second elastic members 222 is respectively connected to the second support 181. When the first voice coil 15 vibrates and displaces up and down in the gap between the first sidewall 1111A of the first magnetic conductive carrying board 111A and the first magnetic circuit module 13, the first elastic members 221 of the plurality of elastic components 22 can prevent the first voice coil 15 from contacting the first sidewall 1111A of the first magnetic conductive carrying board 111A and the first magnetic circuit module 13. When the second voice coil 16 vibrates and displaces up and down in the gap between the second sidewall 1121A of the second magnetic conductive carrying board 112A and the second magnetic circuit module 14, the second elastic members 222 of the plurality of elastic components 22 can prevent the second voice coil 16 from contacting the second sidewall 1121A of the second magnetic conductive carrying board 112A and the second magnetic circuit module 14. Meanwhile, when the first voice coil 15 and the second voice coil 16 stop vibrating, the first voice coil 15 and the second voice coil 16 would return to their original positions. The plurality of elastic components 22 provide support for the balance of the first vibrating component 17 and the second vibrating component 18 and control the gentleness of the vibration amplitude. The elastic components of this embodiment can also be applied to the first embodiment and the second embodiment and can be correspondingly arranged between the supports and the voice coils according to requirements for equivalent effects.

In summary, embodiments of the present disclosure provide a double-sided speaker, wherein a first speaking part is formed by a magnetic conductive carrying board (or a magnetic conductive carrying board component), a first voice coil, a first magnetic circuit module, and a first vibrating component. A second speaking part is formed by a magnetic conductive carrying board and a side magnetic conductive member (or magnetic conductive carrying board component), a second voice coil, a second magnetic circuit module, and a second vibrating component. The first voice coil and the second voice coil speak respectively with the first magnetic circuit module and the second magnetic circuit module for double-sided speaking. The first accommodating space and the second accommodating space are respectively two resonant cavities of the double-sided speaker, where the two resonant cavities are mutually communicated. Thus, without upsizing the double-sided speaker, the size of the resonant cavity of the double-sided speaker can be enlarged to effectively improve the sounding quality for the double-sided speaker.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A double-sided speaker, comprising:

a magnetic conductive carrying board comprising two sidewalls and a bottom plate, the two sidewalls being disposed at two sides of one side surface of the bottom plate;

a side magnetic conductive member disposed at two sides of the other side surface of the bottom plate;

a first magnetic circuit module disposed at one side of the magnetic conductive carrying board;

a second magnetic circuit module disposed at the other side of the magnetic conductive carrying board;

a first voice coil disposed between the first magnetic circuit module and the sidewall;

a second voice coil disposed between the second magnetic circuit module and the side magnetic conductive member;

a first vibrating component disposed at one side of the magnetic conductive carrying board, the first vibrating component comprising a first accommodating space in which the first magnetic circuit module and the first voice coil being disposed; and a second vibrating component disposed at the other side of the magnetic conductive carrying board, the second vibrating component comprising a second accommodating space in which the second magnetic circuit module and the second voice coil being disposed, the second accommodating space communicating with the first accommodating space;

wherein, an overall height of the sidewall is greater than or equal to an overall height of the first magnetic circuit module and/or the second magnetic circuit module.

2. The double-sided speaker according to claim 1, wherein the first vibrating component comprises a first support and a first diaphragm; the first support is disposed at the two sidewalls of the magnetic conductive carrying board; the first diaphragm is disposed at one side of the first support away from the sidewall and is connected to the first voice coil; the second vibrating component comprises a second support and a second diaphragm; the second support is disposed at the side magnetic conductive member; the second diaphragm is disposed at one side of the second support away from the side magnetic conductive member and is connected to the second voice coil.

3. The double-sided speaker according to claim 2, wherein the side magnetic conductive member comprises a through hole; the second support comprises a securing column inserting through the through hole.

4. The double-sided speaker according to claim 3, wherein one end of the securing column comprises a securing end; one end of the through hole comprises a securing hole matching with the securing end; wherein, when the securing column is inserted through the through hole, the securing end is embedded into the securing hole.

5. The double-sided speaker according to claim 2, wherein the first support comprises a first docking component; the second support comprises a second docking component; the first docking component and the second docking component are oppositely disposed and are mutually connected and secured.

6. The double-sided speaker according to claim 2 further comprising a first electrical connecting member and a second electrical connecting member, the first electrical connecting member being disposed at the first support and exposed from an outer surface of the first support, the first voice coil being electrically connected to the first electrical connecting member, the second electrical connecting member being disposed at the second support and exposed from an outer surface of the second support, the second voice coil being electrically connected to the second electrical connecting member.

7. The double-sided speaker according to claim 6, wherein a position on the first support where the first electrical connecting member locates corresponds to a position on the second support where the second electrical connecting member locates.

8. The double-sided speaker according to claim 1 further comprising two auxiliary magnetic conductive members respectively disposed at the two sidewalls.

9. The double-sided speaker according to claim 8, wherein two ends of each of the auxiliary magnetic conductive members comprise a bump; each of the sidewalls comprises a recess relative to the bump; the bump is engaged with the recess.

10. The double-sided speaker according to claim 8, wherein the first vibrating component comprises a first support and a first diaphragm; the first support is disposed at the two sidewalls and the two auxiliary magnetic conductive members of the magnetic conductive carrying board; the first diaphragm is disposed at one side of the first support away from the sidewall and is connected to the first voice coil; the second vibrating component comprises a second support and a second diaphragm; the second support is disposed at the side magnetic conductive member; the second diaphragm is disposed at one side of the second support away from the side magnetic conductive member and is connected to the second voice coil.

11. The double-sided speaker according to claim 1, wherein the first magnetic circuit module further comprises a first magnet and a first magnetic conductive board; the first magnet is disposed at one side surface of the bottom plate; the first magnetic conductive board is disposed at one side of the first magnet away from the bottom plate; the second magnetic circuit module further comprises a second magnet and a second magnetic conductive board; the second magnet is disposed at the other side surface of the bottom plate; the second magnetic conductive board is disposed at one side of the second magnet away from the bottom plate.

12. The double-sided speaker according to claim 11, wherein a height of each of the sidewalls is higher than a height of the first magnet or/and a height of the second magnet.

13. The double-sided speaker according to claim 11, wherein a height of each of the side magnetic conductive members is higher than a height of the first magnet or/and a height of the second magnetic body.

14. The double-sided speaker according to claim 1, wherein the quantity of the side magnetic conductive members is two; each of the side magnetic conductive members comprises a notch; two side edges of the other side surface of the bottom plate are respectively engaged with the notches of the two side magnetic conductive members.

15. The double-sided speaker according to claim 1, wherein the magnetic conductive carrying board further comprises a plurality of communication holes disposed at the bottom plate; the plurality of communication holes intercommunicate the first accommodating space and the second accommodating space.

16. The double-sided speaker according to claim 15, wherein the plurality of communication holes are arranged along an arrangement direction of the sidewall.

17. The double-sided speaker according to claim 15, wherein the plurality of communication holes are disposed at a position close to the sidewall.

18. The double-sided speaker according to claim 1, wherein the first voice coil surrounds the first magnetic circuit module with a gap between them; the second voice coil surrounds the second magnetic circuit module with a gap between them.

19. The double-sided speaker according to claim 1, wherein the sidewall and the bottom plate are integrally formed into one piece.

20. The double-sided speaker according to claim 1, wherein the first accommodating space communicates with the second accommodating space through a front end and a rear end of the magnetic conductive carrying board.

21. A double-sided speaker, comprising:

a magnetic conductive carrying board component comprising a first magnetic conductive carrying board and a second magnetic conductive carrying board, the first magnetic conductive carrying board comprising two first sidewalls and a first bottom plate, the two first sidewalls being disposed at two sides of the first bottom plate, the second magnetic conductive carrying board comprising two second sidewalls and a second bottom plate, the two second sidewalls being disposed at two sides of the second bottom plate; wherein, the first bottom plate and the second bottom plate form a plane, the two first sidewalls are disposed at two sides above the second bottom plate, and the two second sidewalls are disposed at two sides below the first bottom plate;

a first magnetic circuit module disposed at one side of the magnetic conductive carrying board component;

a second magnetic circuit module disposed at the other side of the magnetic conductive carrying board component;

a first voice coil disposed between the first magnetic circuit module and the two first sidewalls;

a second voice coil disposed between the second magnetic circuit module and the two second sidewalls;

a first vibrating component disposed at one side of the magnetic conductive carrying board component, the first vibrating component comprising a first accommodating space in which the first magnetic circuit module and the first voice coil are disposed; and a second vibrating component disposed at the other side of the magnetic conductive carrying board component, the second vibrating component comprising a first accommodating space in which the second magnetic circuit module and the second voice coil are disposed;

wherein, an overall height of the two first sidewalls and the two second sidewalls is greater than or equal to an overall height of the first magnetic circuit module and/or the second magnetic circuit module.

22. The double-sided speaker according to claim 21, wherein the quantity of the first bottom plate is one; the quantity of the second bottom plate is one; the two first sidewalls extend toward two sides above the second bottom plate; the two first sidewalls and the first bottom plate form a U-shaped configuration; the two second sidewalls extend toward two sides below the first bottom plate; the two second sidewalls and the second bottom plate form a U-shaped configuration.

23. The double-sided speaker according to claim 22, wherein the first vibrating component comprises a first support and a first diaphragm; the first support is disposed at the two first sidewalls of the first magnetic conductive carrying board; the first diaphragm is disposed at one side of the first support away from the two first sidewalls and is connected to the first voice coil; the second vibrating component comprises a second support and a second diaphragm; the second support is disposed at the two second sidewalls of the second magnetic conductive carrying board; the second diaphragm is disposed at one side of the second support away from the two second sidewalls and is connected to the second voice coil.

24. The double-sided speaker according to claim 23, wherein the first magnetic circuit module further comprises a first magnet and a first magnetic conductive board; the first magnet is disposed at one side surface of the first bottom plate and the second bottom plate; the first magnetic conductive board is disposed at one side of the first magnet away from the first bottom plate and the second bottom plate; the second magnetic circuit module further comprises a second magnet and a second magnetic conductive board; the second magnet is disposed at the other side surface of the first bottom plate and the second bottom plate; the second magnetic conductive board is disposed at one side of the second magnet away from the first bottom plate and the second bottom plate.

25. The double-sided speaker according to claim 23 further comprising a first electrical connecting member and a second electrical connecting member, the first electrical connecting member being disposed at the first support and exposed from an outer surface of the first support, the first voice coil being electrically connected to the first electrical connecting member, the second electrical connecting member being disposed at the second support and exposed from an outer surface of the second support, the second voice coil being electrically connected to the second electrical connecting member.

26. The double-sided speaker according to claim 22, wherein the magnetic conductive carrying board component further comprises a plurality of communication holes disposed at the first bottom plate and the second bottom plate; the plurality of communication holes intercommunicate the first accommodating space and the second accommodating space and are arranged along an arrangement direction of the first sidewall and the second sidewall.

27. The double-sided speaker according to claim 22, wherein the first voice coil surrounds the first magnetic circuit module with a gap between them; the second voice coil surrounds the second magnetic circuit module with a gap between them.

28. The double-sided speaker according to claim 22, wherein the first accommodating space communicates with the second accommodating space through a front end and a rear end of the magnetic conductive carrying board.

29. The double-sided speaker according to claim 22, wherein the first bottom plate comprises a first bump or/and a first recess; the second bottom plate comprises a second recess or/and a second bump in correspondence with the first bump or/and the first recess of the first bottom plate; the first bump of the first bottom plate is engaged with the second recess of the second bottom plate or/and the first recess of the first bottom plate is engaged with the second bump of the second bottom plate.

30. The double-sided speaker according to claim 22, wherein the magnetic conductive carrying board component comprises a plurality of ventilation holes; the first sidewall, the first bottom plate, and the second sidewall form the plurality of ventilation holes, the second sidewall, the second bottom plate, and the first sidewall form the plurality of ventilation holes, or/and the first sidewall, the first bottom plate, the second sidewall, and the second bottom plate form the plurality of ventilation holes.

31. The double-sided speaker according to claim 30, wherein the plurality of ventilation holes are disposed at a position where the two first sidewalls and the first bottom plate are connected; the plurality of ventilation holes are disposed at a position where the two second sidewalls and the second bottom plate are connected.

32. The double-sided speaker according to claim 30, wherein the first support of the first vibrating component comprises a first notch, and the second support of the second vibrating component comprises a second notch; the first notch corresponds to the second notch; the first notch corresponds to an upper edge of the plurality of ventilation holes of the magnetic conductive carrying board component; the second notch corresponds to a lower edge of the plurality of ventilation holes of the magnetic conductive carrying board component.

33. The double-sided speaker according to claim 21, wherein the quantity of the first bottom plate is multiple; the quantity of the second bottom plate is multiple; two adjacent first bottom plates are spaced apart by the second bottom plate; the two first sidewalls are disposed at two sides of the plurality of first bottom plates; two adjacent second bottom plates are spaced apart by the first bottom plate; the two second sidewalls are disposed at two sides of the plurality of second bottom plates; the plurality of first bottom plates and the plurality of second bottom plates form a plane.

34. The double-sided speaker according to claim 33, wherein the first vibrating component comprises a first support and a first diaphragm; the first support is disposed at the two first sidewalls of the first magnetic conductive carrying board; the first diaphragm is disposed at one side of the first support away from the two first sidewalls and is connected to the first voice coil; the second vibrating component comprises a second support and a second diaphragm; the second support is disposed at the two second sidewalls of the second magnetic conductive carrying board; the second diaphragm is disposed at one side of the second support away from the two second sidewalls and is connected to the second voice coil.

35. The double-sided speaker according to claim 34, wherein a height of each of the first sidewalls and the second sidewalls is higher than a height of the first magnet or/and a height of the second magnet.

36. The double-sided speaker according to claim 34, wherein the first support comprises a first docking component; the second support comprises a second docking component; the first docking component and the second docking component are oppositely disposed and are mutually connected and secured.

37. The double-sided speaker according to claim 33, wherein the magnetic conductive carrying board component further comprises a plurality of communication holes disposed at the first bottom plate and the second bottom plate; the plurality of communication holes intercommunicate the first accommodating space and the second accommodating space and are arranged along an arrangement direction of the first sidewall and the second sidewall.

38. The double-sided speaker according to claim 33, wherein the first voice coil surrounds the first magnetic circuit module with a gap between them; the second voice coil surrounds the second magnetic circuit module with a gap between them.

39. The double-sided speaker according to claim 33, wherein the first accommodating space communicates with the second accommodating space through a front end and a rear end of the magnetic conductive carrying board.

40. The double-sided speaker according to claim 33, wherein the first bottom plate comprises a first bump or/and a first recess; the second bottom plate comprises a second recess or/and a second bump in correspondence with the first bump or/and the first recess of the first bottom plate; the first bump of the first bottom plate is engaged with the second recess of the second bottom plate or/and the first recess of the first bottom plate is engaged with the second bump of the second bottom plate.

41. The double-sided speaker according to claim 33, wherein the magnetic conductive carrying board component comprises a plurality of ventilation holes; the first sidewall, the first bottom plate, and the second sidewall form the plurality of ventilation holes, the second sidewall, the second bottom plate, and the first sidewall form the plurality of ventilation holes, or/and the first sidewall, the first bottom plate, the second sidewall, and the second bottom plate form the plurality of ventilation holes.

42. The double-sided speaker according to claim 41, wherein the plurality of ventilation holes are disposed at a position where the two first sidewalls and the first bottom plate are connected; the plurality of ventilation holes are disposed at a position where the two second sidewalls and the second bottom plate are connected.

43. The double-sided speaker according to claim 41, wherein the first support of the first vibrating component comprises a first notch, and the second support of the second vibrating component comprises a second notch; the first notch corresponds to the second notch; the first notch corresponds to an upper edge of the plurality of ventilation holes of the magnetic conductive carrying board component; the second notch corresponds to a lower edge of the plurality of ventilation holes of the magnetic conductive carrying board component.

44. The double-sided speaker according to claim 21 further comprising a plurality of elastic components comprising two first elastic members and two second elastic members, one side of the two first elastic members being respectively connected to two sides of the first voice coil, the other side of the two first elastic members being respectively connected to the first support, one side of the two second elastic members being respectively connected to two sides of the second voice coil, the other side of the two second elastic members being respectively connected to the second support.

45. The double-sided speaker according to claim 21, wherein a position on the first support where the first electrical connecting member locates corresponds to a position on the second support where the second electrical connecting member locates.

46. The double-sided speaker according to claim 21, wherein the first bottom plate comprises a first convex surface; the second bottom plate comprises a second convex surface; the first convex surface and the second convex surface form a boss.

* * * * *